United States Patent
Atarius et al.

(10) Patent No.: US 12,402,003 B2
(45) Date of Patent: Aug. 26, 2025

(54) USING A PSEUDONYM FOR ACCESS AUTHENTICATION OVER NON-3GPP ACCESS

(71) Applicant: Lenovo (Singapore) Pte. Ltd., New Tech Park (SG)

(72) Inventors: Roozbeh Atarius, La Jolla, CA (US); Apostolis Salkintzis, Athens (GR); Andreas Kunz, Ladenburg (DE); Sheeba Backia Mary Baskaran, Friedrichsdorf (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 202 days.

(21) Appl. No.: 18/010,641

(22) PCT Filed: Jun. 15, 2020

(86) PCT No.: PCT/EP2020/066521
§ 371 (c)(1),
(2) Date: Dec. 15, 2022

(87) PCT Pub. No.: WO2021/254595
PCT Pub. Date: Dec. 23, 2021

(65) Prior Publication Data
US 2023/0224704 A1     Jul. 13, 2023

(51) Int. Cl.
*H04L 29/06* (2006.01)
*H04L 9/32* (2006.01)
(Continued)

(52) U.S. Cl.
CPC ......... *H04W 12/062* (2021.01); *H04L 9/3239* (2013.01); *H04W 12/033* (2021.01)

(58) Field of Classification Search
CPC . H04W 12/062; H04W 12/033; H04W 12/03; H04W 12/037; H04W 12/04; H04W 12/041; H04W 12/06; H04L 9/3239
See application file for complete search history.

(56) References Cited

U.S. PATENT DOCUMENTS

2018/0054730 A1* 2/2018 Hong ............... H04W 76/12
2019/0007376 A1* 1/2019 Norrman ............ H04L 63/0876
(Continued)

OTHER PUBLICATIONS

PCT/IB2021/066521, "Notification of Transmittal of the International Search Report and the Written Opinion of the International Searching Authority, or the Declaration", International Searching Authority, Feb. 11, 2021, pp. 1-15.
(Continued)

*Primary Examiner* — Malcolm Cribbs
(74) *Attorney, Agent, or Firm* — Kunzler Bean & Adamson

(57) ABSTRACT

Apparatuses, methods, and systems are disclosed for using a pseudonym for access authentication over non-3GPP access. One apparatus includes a processor and a transceiver that communicates with a mobile communication network using a 3GPP access network and a non-3GPP access network. The processor sends a registration message to a first network function in the mobile communication network via the 3GPP access network, the first authentication message comprising a first indicator and a SUCI for the apparatus, wherein the first indicator comprises an indication that the apparatus has the capability for access authentication for non-3GPP access in an EPS. The processor receives a first identity pseudonym for the apparatus in response to the registration message comprising the first indicator and performs access authentication via a non-3GPP access network using the first identify pseudonym.

19 Claims, 13 Drawing Sheets

(51) Int. Cl.
*H04W 12/033* (2021.01)
*H04W 12/062* (2021.01)

(56) References Cited

U.S. PATENT DOCUMENTS

2019/0014096 A1* 1/2019 Hancock .............. H04L 9/3263
2020/0305118 A1* 9/2020 Ryu ..................... H04W 76/10
2020/0351980 A1* 11/2020 Talebi Fard .......... H04W 76/40

OTHER PUBLICATIONS

P. Eronen et al., "Diameter Extensible Authentication Protocol (EAP) Application", IETF RFC 4072 Standards Track, Aug. 2005, pp. 1-33.
J. Arkko et al., "Extensible Authentication Protocol Method for 3rd Generation Authentication and Key Agreement (EAP-AKA)", IETF RFC 4187 Standards Track, Jan. 2006, pp. 1-79.
J. Arkko et al., "Improved Extensible Authentication Protocol Method for 3rd Generation Authentication and Key Agreement (EAP-AKA')", May 2009, pp. 1-29.
3GPP, "3rd Generation Partnership Project; Technical Specification Group Core Network and Terminals; Numbering, addressing and identification; (Release 16)", 3GPP TS 23.003 V16.2.0, Mar. 2020, pp. 1-140.
3GPP, "3rd Generation Partnership Project; Technical Specification Group Services and System Aspects; Architecture enhancements for non-3GPP accesses (Release 16)", 3GPP TS 23.402 V16.0.0, Jun. 2019, pp. 1-314.
3GPP, "3rd Generation Partnership Project; Technical Specification Group Core Network and Terminals; Access to the BGPP Evolved Packet Core (EPC) via non-3GPP access networks; Stage 3 (Release 16)", 3GPP TS 24.302 V16.3.0, Dec. 2019, pp. 1-177.
3GPP, "3rd Generation Partnership Project; Technical Specification Group Core Network and Terminals; Non-Access-Stratum (NAS) protocol for 5G System (5GS); Stage 3; (Release 16)", 3GPP TS 24.501 V16.4.1, Mar. 2020, pp. 1-666.
3GPP, "3rd Generation Partnership Project; Technical Specification Group Core Network and Terminals; Cx and Dx interfaces based on the Diameter protocol; Protocol details (Release 16)", 3GPP TS 29.229 V16.1.0, Dec. 2019, pp. 1-41.
3GPP, "3rd Generation Partnership Project; Technical Specification Group Core Network and Terminals; Evolved Packet System (EPS); 3GPP EPS AAA interfaces (Release 16)", 3GPP TS 29.273 V16.0.0, Mar. 2020, pp. 1-200.
3GPP, "3rd Generation Partnership Project; Technical Specification Group Services and System Aspects; 3GPP System Architecture Evolution (SAE); Security aspects of non-3GPP accesses (Release 15)", 3GPP TS 33.402 V15.1.0, Jun. 2018, pp. 1-72.
3GPP, "3rd Generation Partnership Project; Technical Specification Group Services and System Aspects; Security architecture and procedures for 5G system (Release 15)", 3GPP TS 33.501 V15.1.0, Jun. 2018, pp. 1-152.
3GPP, "3rd Generation Partnership Project; Technical Specification Group Radio Access Network; NR; Radio Resource Control (RRC) protocol specification (Release 15)", 3GPP TS 38.331 V15.8.0, Dec. 2019, pp. 1-532.

* cited by examiner

USING A PSEUDONYM FOR ACCESS AUTHENTICATION OVER NON-3GPP ACCESS

The subject matter disclosed herein relates generally to obtaining a pseudonym to use for access authentication over non-3GPP access technology.

BACKGROUND

The following abbreviations and acronyms are herewith defined, at least some of which are referred to within the following description.

Third Generation Partnership Project ("3GPP"), Fifth-Generation Core network ("5GC"), 5G Mobility Management ("5GMM") Access and Mobility Management Function ("AMF"), Access Point Name ("APN"), Access Stratum ("AS"), Access Network Information ("ANI"), Application Programing Interface ("API"), Data Network Name ("DNN"), Downlink ("DL"), Enhanced Mobile Broadband ("eMBB"), Evolved Node-B ("eNB"), Evolved Packet Core ("EPC"), Evolved Packet System ("EPS"), Evolved UMTS Terrestrial Radio Access Network ("E-UTRAN"), Home Public Land Mobile Network ("HPLMN"), Home Subscriber Server ("HSS"), International Mobile Subscriber Identity ("IMSI"), IP Multimedia Subsystem ("IMS," aka "IP Multimedia Core Network Subsystem"), Internet Protocol ("IP"), Long Term Evolution ("LTE"), LTE Advanced ("LTE-A"), Medium Access Control ("MAC"), Mobile Network Operator ("MNO"), Mobility Management Entity ("MME"), Non-Access Stratum ("NAS"), Narrowband ("NB"), Network Function ("NF"), Network Access Identifier ("NAI"), Next Generation (e.g., 5G) Node-B ("gNB"), Next Generation Radio Access Network ("NG-RAN"), New Radio ("NR"), Policy Control Function ("PCF"), Packet Data Network ("PDN"), Packet Data Unit ("PDU"), PDN Gateway ("PGW"), Public Land Mobile Network ("PLMN"), Quality of Service ("QoS"), Radio Access Network ("RAN"), Radio Access Technology ("RAT"), Radio Resource Control ("RRC"), Receive ("Rx"), Security Mode Control ("SMC"), Single Network Slice Selection Assistance Information ("S-NSSAI"), Serving Gateway ("SGW"), Session Management Function ("SMF"), Subscription Concealed Identifier ("SUCI"), Subscription Permanent Identifier ("SUPI"), Transmission Control Protocol ("TCP"), Transmit ("Tx"), Trusted Non-3GPP Access Network ("TNAN"), Trusted Non-3GPP Access Point ("TNAP"), Trusted Non-3GPP Gateway Function ("TNGF"), Unified Data Management ("UDM"), User Entity/Equipment (Mobile Terminal) ("UE"), Uplink ("UL"), User Plane ("UP"), Universal Mobile Telecommunications System ("UMTS"), User Data Management ("UDM"), User Datagram Protocol ("UDP"), User Location Information ("ULI"), User Entity/Equipment ("UE"), UE Parameters Update ("UPU"), Visited Public Land Mobile Network ("VPLMN"), Wireless Local Area Network ("WLAN"), and Worldwide Interoperability for Microwave Access ("WiMAX").

In certain embodiments, a 5G-capable UE may access an Evolved Packet Core ("EPC", i.e., 4G core network) via a non-3GPP access network. The identity which is used by a 5G UE for access authentication for non-3GPP access in EPS, as defined in subclause 6 in 3GPP TS 33.402 v16.2.0, is currently sent in clear text. However, this is against the 5G requirement that the identity of a 5G UE must not be exposed.

BRIEF SUMMARY

One method of a remote unit, e.g., a UE, for using a pseudonym for access authentication over non-3GPP access includes sending a registration message to a first network function in the mobile communication network via the 3GPP access network, the first authentication message comprising a first indicator and a SUCI for the UE, wherein the first indicator comprises an indication that the UE has the capability for access authentication for non-3GPP access in an EPS. The method includes receiving a first identity pseudonym for the UE in response to the registration message comprising the first indicator and performs access authentication via a non-3GPP access network using the first identify pseudonym One method of a first network function, e.g., a UDM, for using a pseudonym for access authentication over non-3GPP access includes receiving a registration request from a remote unit, where the registration request contains a first indicator and a SUCI for the remote unit. The method includes acquiring an identity pseudonym for the remote unit in response to receiving the first indicator and storing a mapping of the identity pseudonym to a subscriber identity of the remote unit. The method includes sending the identity pseudonym to the remote unit, where the mobile communication network uses the identity pseudonym to authenticate the remote unit for non-3GPP access in an EPS.

One method of a second network function, e.g., an AAA server, for using a pseudonym for access authentication over non-3GPP access includes receiving a first authentication message to authenticate a remote unit with the mobile communication network via a non-3GPP access network, the first authentication message comprising a first identity pseudonym for the remote unit. Here, the first identity pseudonym was received by the remote unit during a previous registration with the mobile communication network via a 3GPP access network. The method includes retrieving an authentication vector for the first identity pseudonym, creates a second identity pseudonym for the remote unit, and stores the second identity pseudonym in the mobile communication network. The method includes sending a second authentication message to the remote unit and completes authentication with the remote unit. Here, the second authentication message comprising the second identity pseudonym and a challenge packet derived from the authentication vector.

Another method of a UE for using a pseudonym for access authentication over non-3GPP access includes sending a first authentication message to a second network function to authenticate with the mobile communication network via the non-3GPP access network. Here, the first authentication message comprises a first identity pseudonym received by the UE during a previous registration with the mobile communication network via the 3GPP access network. The method includes receiving a second authentication message from the second network function in response to the first authentication message. Here, the second authentication message comprises a challenge packet and a second identity pseudonym, where the mobile communication network generates the second identity pseudonym in response to the first authentication message comprising a first identity pseudonym. The method includes completing authentication with the mobile communication network using the challenge packet and locally storing the second identity pseudonym.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

Figure 1A:
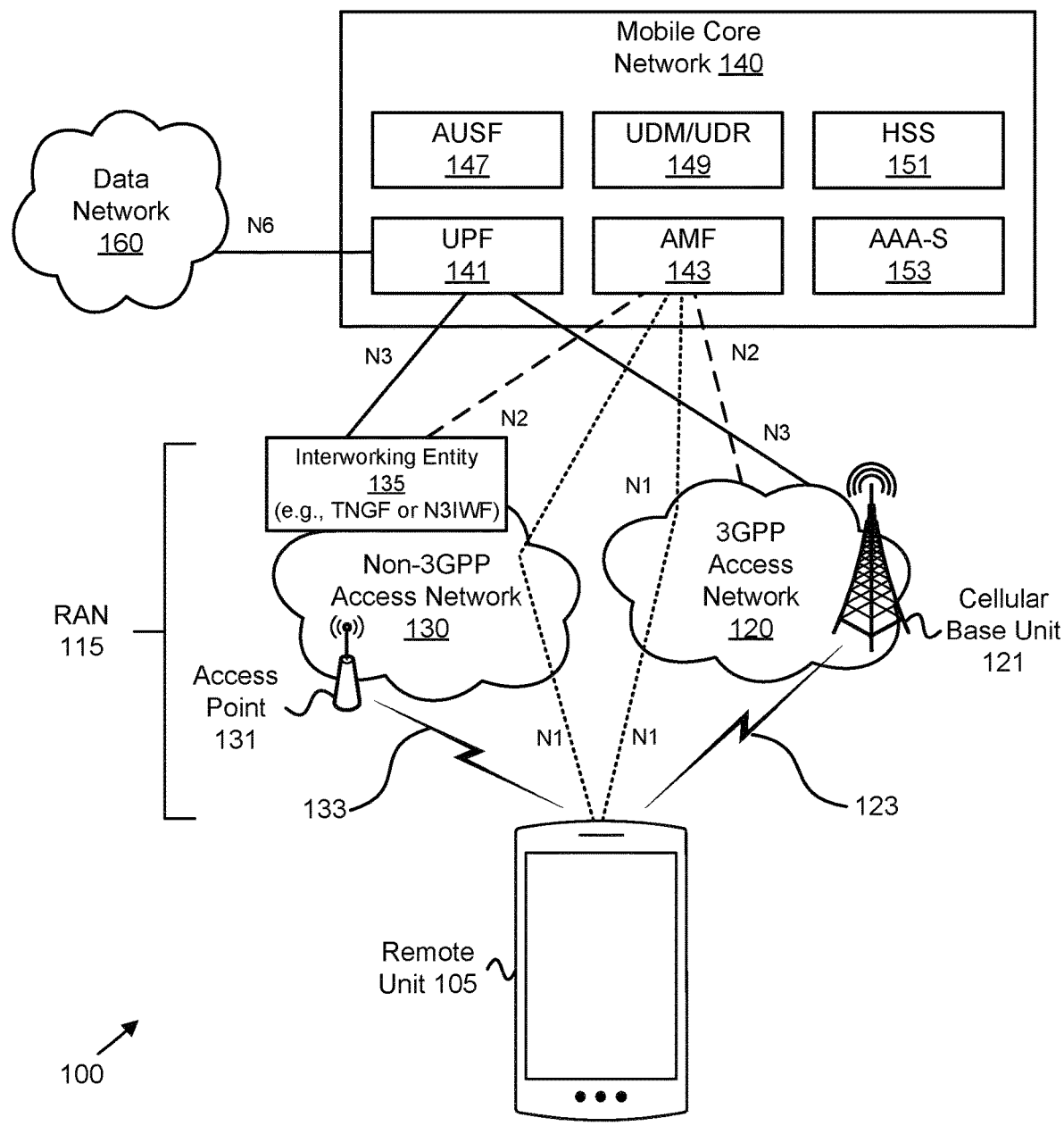
FIG. 1 is a diagram illustrating one embodiment of a wireless communication system for using a pseudonym for access authentication over non-3GPP access.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects.

For example, the disclosed embodiments may be implemented as a hardware circuit comprising custom very-large-scale integration ("VLSI") circuits or gate arrays, off-the-shelf semiconductors such as logic chips, transistors, or other discrete components. The disclosed embodiments may also be implemented in programmable hardware devices such as field programmable gate arrays, programmable array logic, programmable logic devices, or the like. As another example, the disclosed embodiments may include one or more physical or logical blocks of executable code which may, for instance, be organized as an object, procedure, or function.

Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random-access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store, a program for use by or in connection with an instruction execution system, apparatus, or device.

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

As used herein, a list with a conjunction of "and/or" includes any single item in the list or a combination of items in the list. For example, a list of A, B and/or C includes only A, only B, only C, a combination of A and B, a combination of B and C, a combination of A and C or a combination of A, B and C. As used herein, a list using the terminology "one or more of" includes any single item in the list or a combination of items in the list. For example, one or more of A, B and C includes only A, only B, only C, a combination of A and B, a combination of B and C, a combination of A and C or a combination of A, B and C. As used herein, a list using the terminology "one of" includes one and only one of any single item in the list. For example, "one of A, B and C" includes only A, only B or only C and excludes combinations of A, B and C. As used herein, "a member selected from the group consisting of A, B, and C," includes one and only one of A, B, or C, and excludes combinations of A, B, and C. As used herein, "a member selected from the group consisting of A, B, and C and combinations thereof" includes only A, only B, only C, a combination of A and B, a combination of B and C, a combination of A and C or a combination of A, B and C.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. This code may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams.

The code may also be loaded onto a computer, other programmable data processing apparatus, or other devices to cause a series of operational steps to be performed on the computer, other programmable apparatus, or other devices to produce a computer implemented process such that the code which execute on the computer or other programmable apparatus provide processes for implementing the functions/acts specified in the schematic flowchart diagrams and/or schematic block diagram.

The schematic flowchart diagrams and/or schematic block diagrams in the Figures illustrate the architecture, functionality, and operation of possible implementations of apparatuses, systems, methods, and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

The description of elements in each figure may refer to elements of proceeding figures. Like numbers refer to like elements in all figures, including alternate embodiments of like elements.

Methods, apparatuses, and systems are disclosed for using a pseudonym for access authentication over non-3GPP access.

Currently the procedure for authentication and key agreement in subclause 6.2 in 3GPP TS 33.402 v16.2.0—which is mandatory for trusted non-3GPP access and optional for untrusted non-3GPP access—foresees that the UE may send its IMSI in clear text, i.e. unencrypted, over that air interface and to the AAA server in the core network. Alternatively, the UE may send (in clear text) a pseudonym allocated to the UE in a previous run of the authentication procedure. A 5G UE is backwards compatible to earlier generations, but the security measures implemented in earlier technologies do not have the same level of security as in 5G, i.e. lower security than in 5G.

The resulting problem is a bidding down attack of a 5G capable UE to make it, expose its secret subscriber identity when the 5G UE is to be authenticated to, e.g., an untrusted non-3GPP access to 5GCN. As discussed above, the 5G UE (likewise 4G UE) may send its secret subscriber identity directly in the first message or as an answer to the identity request message. However, this 4G behavior of a 5G UE may be a violation of the 5G requirement which may require that its subscriber identity (for example, SUPI—which may contain IMSI), may need to be concealed in the first message or as an answer to the identity request message.

Figure 2:
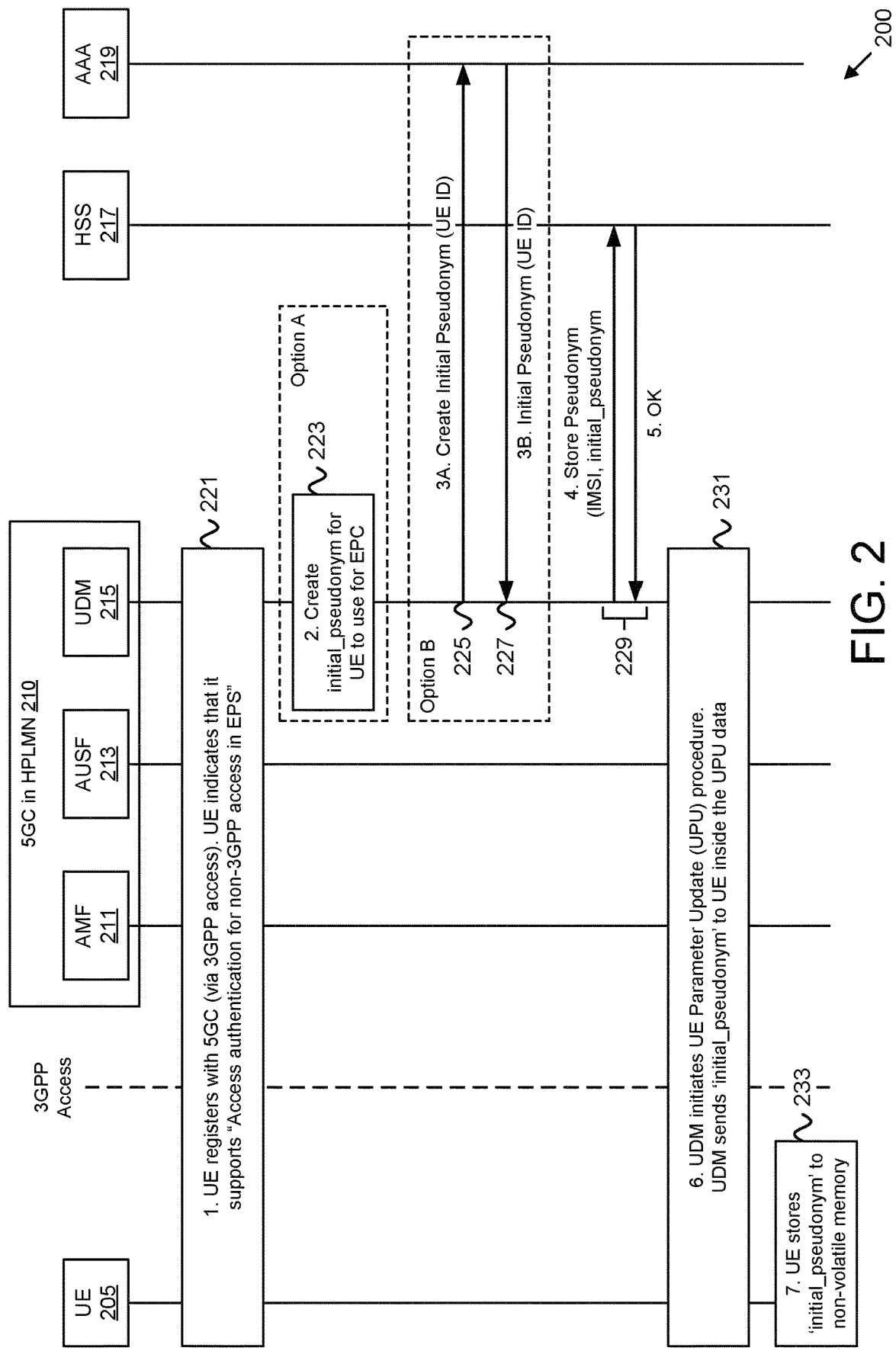
FIG. 2 is a signal flow diagram illustrating one embodiment of creating an identity pseudonym.
Figure 3:
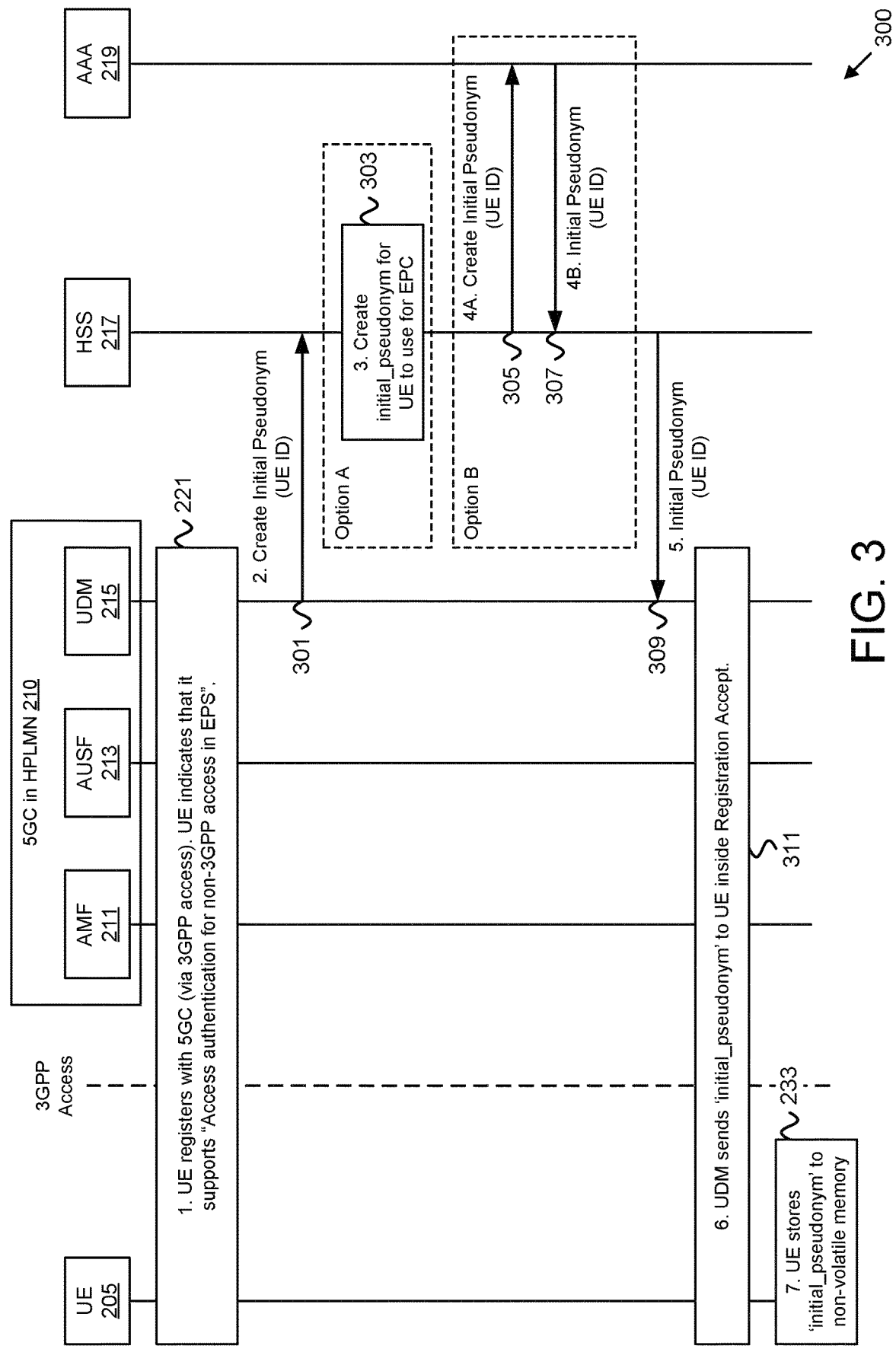
FIG. 3 is a signal flow diagram illustrating one embodiment of creating an identity pseudonym.
Figure 4A:
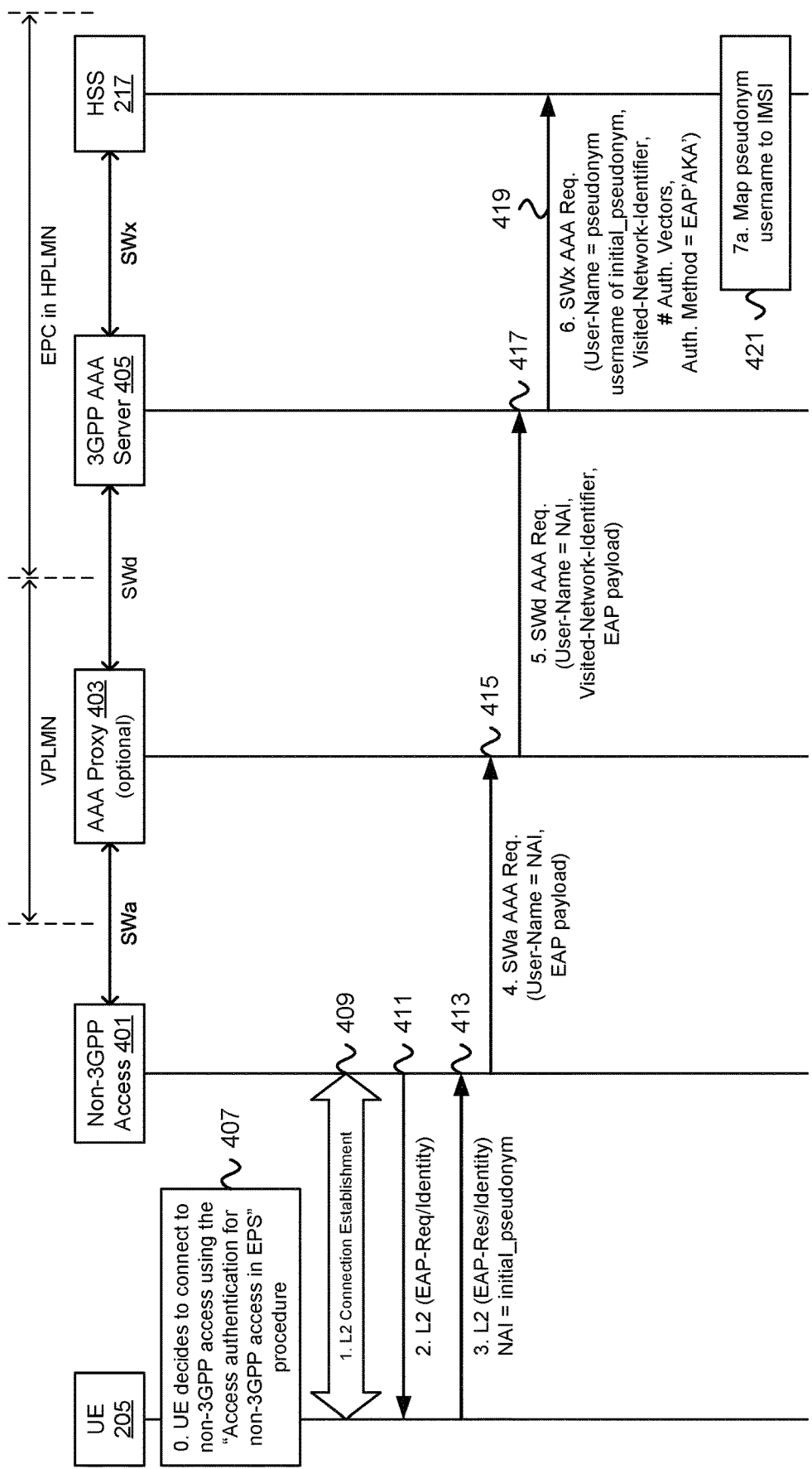
FIG. 4A is a signal flow diagram illustrating one embodiment of a first solution for TNGF reauthentication.
Figure 4B:
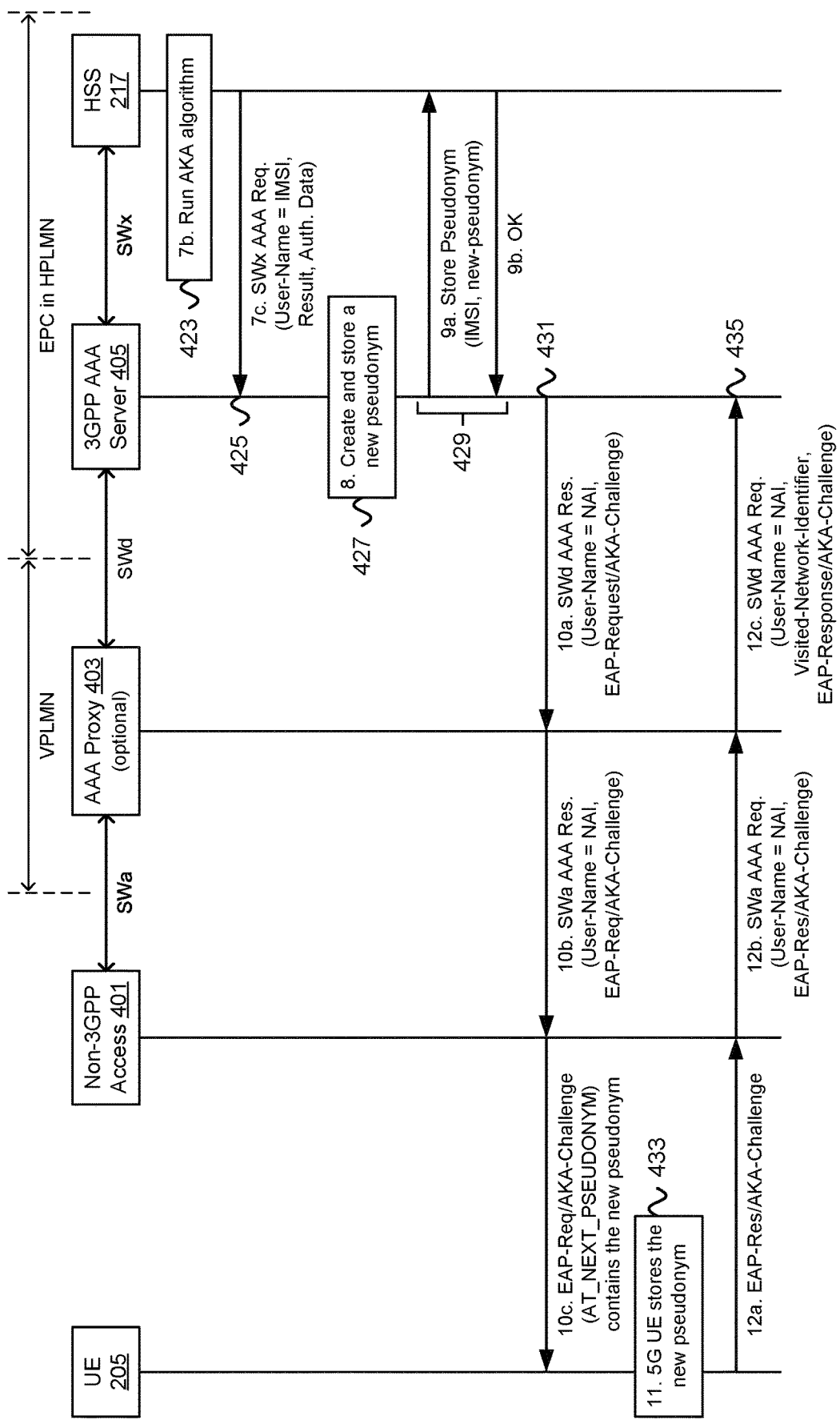
FIG. 4B is a continuation of the procedure depicted in FIG. 4A.
Figure 4C:
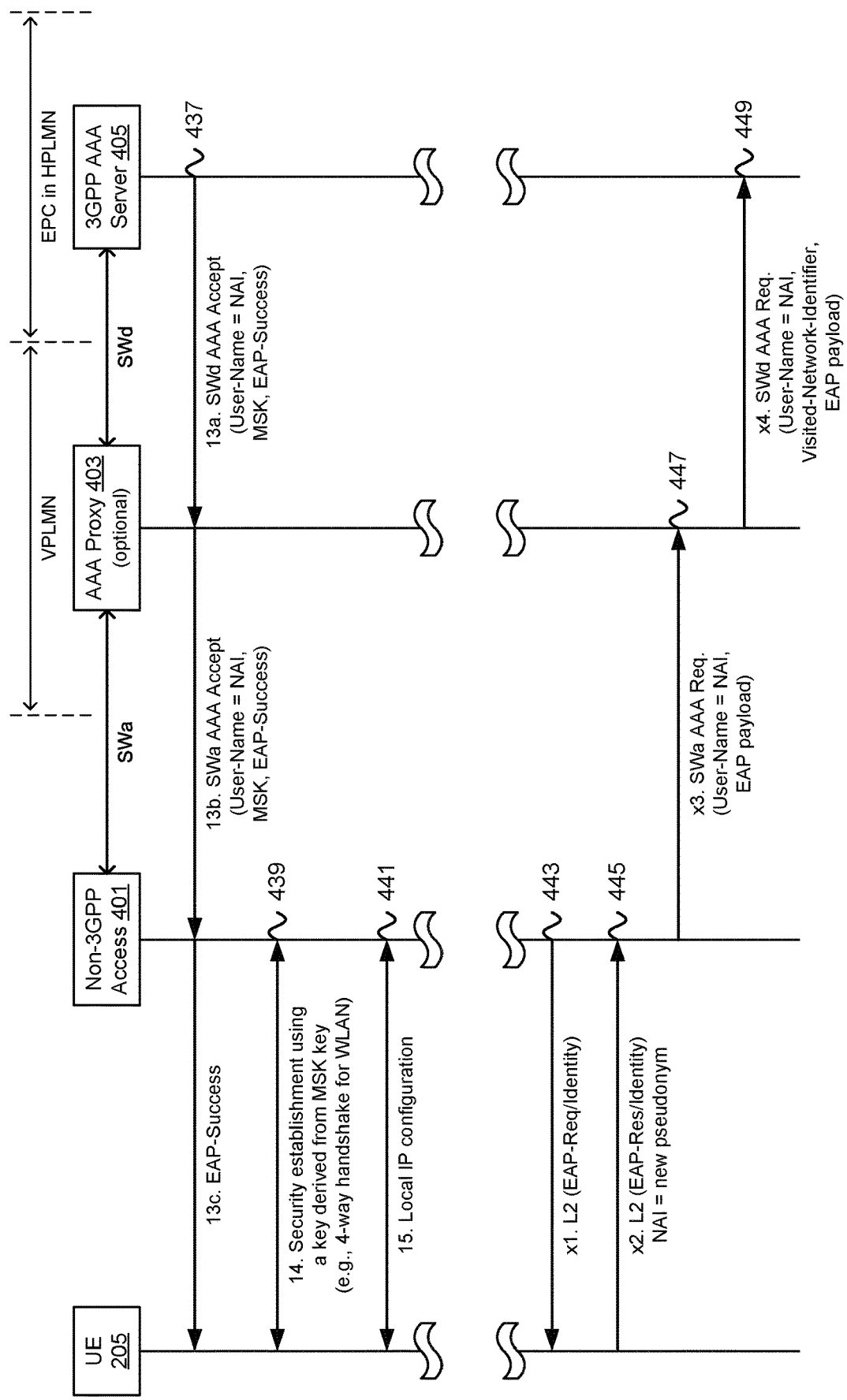
FIG. 4C is a continuation of the procedure depicted in FIG. 4B.

Described herein are solutions to the above problem of a 5G UE maintaining the secrecy of the UE permanent subscriber identity, while maintaining backwards compatibility with 4G systems and procedures. To prevent revealing the UE permanent subscriber identity, a pseudonym is generated by the network, e.g., 5GCN, to use when performing access authentication over non-3GPP access. An example of system architecture for using a pseudonym for access authentication over non-3GPP access is shown in FIG. 1. Examples of procedures to receive an initial pseudonym are shown in FIGS. 2 and 3. An example of a procedure for access authentication using a pseudonym, such as the initial pseudonym, is shown in FIG. 4A-4C.

Note that even if the UE can act as a 4G UE, it is still having the same permanent identity or IMSI as the 5G UE, therefore the 5G requirement of not sending the permanent identity via cleartext should be applied here. Therefore, a dual mode UE (e.g., 5G UE that is also a 4G UE) should always register in a manner that it gets the temporary ID or concealed permanent ID for the 4G registration in case the UE needs to do that registration.

According to a first solution, the 5G UE may register with 5GCN by using 3GPP access. The 5G UE may indicate its capability for access authentication for non-3GPP access in EPS during the registration to the 5GCN by using the 3GPP access. In one embodiment, the access authentication for non-3GPP access in EPS is as defined in subclause 6 in 3GPP TS 33.402. This indication for the capability for access authentication for non-3GPP access in EPS, may be included as a value for the 5GMM capability information element (e.g., defined in 3GPP TS 24.501). The indication for the capability for access authentication for non-3GPP access in EPS may indicate the network that the 5G UE may support the EAP-AKA' authentication method (e.g., defined in IETF RFC 5448).

The indication for the capability for access authentication for non-3GPP access in EPS may hint to the network to provide the UE with information about accessibility to the non-3GPP access networks for authenticating for non-3GPP access in EPS. In one embodiment, this accessibility information may be conveyed to the 5G UE from the PCF via AMF in forms of URSP rules. For the 5G UE to receive such information may be dependent on the user subscription, where if the user subscription allows it, then the PCF transmits the new URSP rules to the 5G UE.

The indication for the capability for access authentication for non-3GPP access in EPS may trigger the UDM to create an initial pseudonym. For this procedure, the UDM may need to obtain the 5G UE's SUPI from the SUCI (using the SIDF functionality offered by the UDM) which may have been used by the 5G UE at the time of registration to the 5GCN. The SIDF may obtain the 5G UE's SUPI from the SUCI by de-concealing SUCI and provide it to the UDM.

In some embodiments, the creation of the initial pseudonym is performed locally at the UDM. The UDM may create the initial pseudonym based on the 5G UE's SUPI where the SUPI type is IMSI), according to techniques discussed herein, and store the created initial pseudonym and the UE identifier (i.e., 5G UE SUPI, 5G UE SUPI of type IMSI, or 5G UE IMSI) at a location of the mobile network where it is accessible by non-3GPP access network. For example, the UDM/UDR may store the 5G UE's SUPI and the created initial pseudonym in an HSS. In other embodiments, the creation of the initial pseudonym is performed by an AAA entity (e.g., a 3GPP AAA server). Here, the UDM sends a request directly to the AAA entity to create the initial pseudonym, the request comprising the 5G UE's IMSI for creation of the initial pseudonym, wherein the AAA entity may create the initial pseudonym based on the 5G UE's IMSI. Note that the AAA entity may be the same or a different AAA entity as the 3GPP AAA server that performs access authentication with the 5G UE for non-3GPP access in EPS.

One option for the generation of the initial pseudonym may be similar to a one time token generation and it can be based on a random number generator/hash function which may create appropriate unique output for the initial pseudonym taking IMSI and any random number/nonce as input. Alternatively, the UDM (or AAA entity) may generate an initial pseudonym by encrypting the IMSI using any secret key (Home network Private/Secret Key) available in the UDM (or AAA entity). Further, the input to the encryption algorithm at UDM/AAA can be a clear text which is composed of the compressed IMSI concatenated with a random number. The initial pseudonym may have the format of an IMSI.

The UDM may store the 5G UE's IMSI and the created initial pseudonym in an HSS. The UDR may store the 5G UE's SUPI, 5G UE's SUPI where the SUPI type is IMSI, 5G UE's IMSI and the created initial pseudonym.

The UDM may provide the initial pseudonym in the subscription profile to the AMF which may send the created initial pseudonym to the 5G UE in the registration accept message. Alternatively, the UDM may send the created initial pseudonym to the 5G UE by using the UE parameter update procedure where the UE assigned parameters are updated by the network. The 5G UE may store the initial pseudonym to a non-volatile memory.

The 5G UE may use the initial pseudonym for access authentication for non-3GPP access in EPS, e.g., using the procedure defined in subclause 6 in 3GPP TS 33.402. The 5G UE may use the initial pseudonym for access authentication for non-3GPP access in EPS in order not to reveal its SUPI and/or IMSI. In one embodiment, the SUPI type is IMSI.

In the first solution, the 5G UE may also be a 4G UE or any other generation UE. As an example if the 5G UE is also a 4G UE and is capable to perform the EPC registration, the AAA server may create the initial pseudonym which may be similar to a one time token and can be based on a random number generator which may create appropriate unique output. The initial pseudonym may have the format of an IMSI. The AAA server may store the UE's IMSI and the created initial pseudonym in an HSS.

According to a second solution, after the UDM obtains the 5G UE's SUPI form the SIDF, the UDM may send a request comprising the 5G UE's IMSI for creation of the initial pseudonym, towards the HSS. In some embodiments, the creation of the initial pseudonym is performed locally at the HSS. The HSS may create the initial pseudonym based on the 5G UE's permanent identity, according to techniques discussed herein, and store the created initial pseudonym and the UE identifier (i.e., 5G UE SUPI, 5G UE SUPI of type IMSI, or 5G UE IMSI). Alternatively, the HSS may interact with an AAA entity (e.g., a 3GPP AAA server) to create the initial pseudonym based on the 5G UE's IMSI. Here, the HSS sends a request to the AAA entity to create the initial pseudonym, the request comprising the 5G UE's IMSI for creation of the initial pseudonym, wherein the AAA entity may create the initial pseudonym based on the 5G UE's IMSI. Note that the AAA entity may be the same or a different AAA entity as the 3GPP AAA server that performs access authentication with the 5G UE for non-3GPP access in EPS.

One option for the generation of the initial pseudonym may be similar to a one time token generation and it can be based on a random number generator/hash function which may create appropriate unique output for the initial pseudonym taking IMSI and any random number/nonce as input. Alternatively, the creation of the initial pseudonym may include encrypting the IMSI using any secret key (Home network Private/Secret Key) available in the HSS (or AAA). Further, the input to the encryption algorithm at HSS can be a clear text which is composed of the compressed IMSI concatenated with a random number. The initial pseudonym may have the format of an IMSI.

The HSS may store a matching pair of 5G UE's SUPI and the initial pseudonym. Alternatively, the HSS may store a matching pair of 5G UE's IMSI and the initial pseudonym. In one embodiment, the 5G UE's SUPI type is IMSI. The HSS may send the 5G UE's identifier (e.g., 5G UE's SUPI where SUPI type is IMSI, or 5G UE's IMSI) and the initial pseudonym to the UDM/UDR. The UDR may store the 5G UE's SUPI where the SUPI type is IMSI, 5G UE's IMSI and the created initial pseudonym.

In the second solution, the 5G UE may also be a 4G UE or any other generation UE. As an example if the 5G UE is also a 4G UE and is capable to perform the EPC registration, the AAA server may create the initial pseudonym which may be similar to a one time token and can be based on a random number generator which may create appropriate unique output. The initial pseudonym may have the format of an IMSI. The AAA server may store the UE's IMSI and the created initial pseudonym in an HSS.

According to a third solution, is assumed that the initial pseudonym may be assigned to the 4G UE or the 5G UE (or any other generation UE) by means of configuration which may be but is not limited by using UICC, USIM, SIM or internally in the ME. In all cases, the configuration may be done that the UE or the 5G UE stores the initial pseudonym in a non-volatile memory. The initial pseudonym may at the same time be stored in several UDMs/UDRs, several 3GPP AAA servers, several AAA proxies and several HSS for access authentication for non-3GPP access in EPS as defined in subclause 6 in TS 3GPP 33.402 or any other registration or configuration update.

According to a fourth solution, in order to access authenticate for non-3GPP access in EPS, the 5G UE may use NAI which may be constructed by the initial pseudonym, i.e., pseudonym-NAI, for the EAP-AKA' procedures. In this solution, the 5G UE may have the initial pseudonym, e.g., according to one of the above solutions. At the time of registration with 5GCN by using 3GPP access (e.g., discussed above in the first and second solutions), the 5G UE may receive an indication that the network has the capability for access authentication for non-3GPP access in EPS in the register accept message.

The 5G UE may receive the indication for the network capability for access authentication for non-3GPP access in EPS, as a value for the 5GS network feature support information element (e.g., defined in 3GPP TS 24.501). The network capability for access authentication for non-3GPP access in EPS may hint to the 5G UE that it may require using such an authentication procedure to get access to some, but not all non-3GPP access networks. The network capability for access authentication for non-3GPP access in EPS, may hint the 5G UE that it may require using such an authentication procedure to get access to some services. The 5G UE may connect to the non-3GPP access for the access authentication for non-3GPP access in EPS.

The pseudonym-NAI may be prepended with a special character (e.g., the single digit "7" as described in IETF RFC 5448 and 3GPP TS 23.003) to indicate the EAP-AKA' method for the access authentication for non-3GPP access in EPS. As an example, if the initial pseudonym username is 7y34fa8123 and the IMSI is IMSI is 234150999999999, the NAI may be "7"<7y34fa8123>@nai.epc.mnc150.mcc234.3gppnetwork.org, where the prefix "7" indicates the NAI is a pseudonym-NAI for the EAP-AKA' procedure.

According to 3GPP TS 29.273, the non-3GPP access may use the Diameter Extensible Authentication Protocol (EAP) Application (e.g., specified in IETF RFC 4072) for the SWa interface to send the NAI in the Attribute-Value Pair ("AVP") user-name and EAP payload in EAP-payload AVP towards the possibly existing proxy AAA, to authenticate for non-3GPP access in EPS. The NAI in the AVP user-name and EAP payload in EAP-payload AVP may further be sent towards the 3GPP AAA server by using the Diameter EAP Application (e.g., as specified in IETF RFC 4072, according to 3GPP TS 29.273).

The 3GPP AAA server may extract the pseudonym from the NAI. If the 3GPP AAA can match the pseudonym to the 5G UE's IMSI to determine the 5G UE's identity, then the 3GPP AAA may forward the IMSI to an HSS by using an AVP such as the user-name AVP (described in IETF RFC 4072). However, if the 3GPP AAA cannot match the pseudonym to the 5G UE's IMSI to determine the 5G UE's identity, then the 3GPP AAA may forward the pseudonym to the HSS, which may be a centralized network storage that has stored the matching 5G UE's IMSI for the pseudonym, by using an AVP such as the user-name AVP. Note that in case the 5G UE is in a visited network, then the 3GPP AAA may send the identity of the visited network by using a Diameter AVP such as Visited-Network-Identifier AVP (described in 3GPP TS 29.229).

Upon receipt of the pseudonym, the HSS may match the pseudonym to the 5G UE's IMSI, which may have been stored at the time of creation the initial pseudonym, to determine the 5G UE's identity (e.g., IMSI). The HSS may send the UE's identity such as IMSI to the 3GPP AAA by using an AVP such as the user-name AVP.

The 3GPP AAA may send a request for a set of new authentication vectors by using a Diameter AVP, e.g., SIP-Number-Auth-Items AVP (described in 3GPP TS 29.229). Because the authentication method is EAP-AKA', the 3GPP AAA may send the identity of the access network by using a Diameter AVP, such as ANID AVP (described in 3GPP TS 29.273). The 3GPP AAA may send the authentication method—which may be EAP-AKA'—by using a Diameter AVP, such as SIP-Authentication-Scheme AVP (described in 3GPP TS 29.229).

The HSS may successfully generate one or more authentication vectors by using the information received from the 3GPP AAA to be sent to the 3GPP AAA. The HSS may send a success result code to the 3GPP AAA by using an AVP, such as the Result-Code AVP (described in IETF RFC 4072). The HSS may send the number of one or more authentications vectors to the 3GPP AAA by using an AVP, such as SIP-Number-Auth-Items (described in 3GPP TS 29.229). The HSS may send the authentication data content to the 3GPP AAA by a grouped AVP, such as SIP-Auth-Data-Item (described in 3GPP TS 29.229).

The grouped AVP may include: the authentication method EAP-AKA' in an AVP, such as SIP-Authentication-Scheme; the authentication challenge RAND; the token AUTN in an AVP, such as SIP-Authenticate (described in 3GPP TS 29.229); the expected response XRES in an AVP such as SIP-Authorization AVP (described in 3GPP TS 29.229); the confidentiality key CK' in an AVP, such as Confidentiality-Key AVP (described in 3GPP TS 29.229); and the integrity key IK' in an AVP, such as Integrity-key AVP (described in 3GPP TS 29.229).

Upon receipt of a successful response and the authentication data from the HSS, the 3GPP AAA server may generate the MSK and EMSK (e.g., as defined in IETF RFC 5448). The 3GPP AAA server may create a new pseudonym to match the 5G UE's IMSI. The 3GPP AAA server may store the new pseudonym locally for future 5G UE registrations to 5GCN or the future 5G UE access authentications for non-3GPP access in EPS. The 3GPP AAA server may store the 5G UE identity and create a binding with the stored pseudonym.

The 3GPP AAA server may forward to the HSS the new pseudonym and the 5G UE's identity, which may be, but is not limited to, the matching 5G UE's IMSI. The HSS may be a centralized network storage that has stored the 5G UE's identity (e.g., the matching 5G UE's IMSI) for the initial pseudonym. If the HSS has already assigned corresponding values for these parameters, the HSS may replace those values with the new values. The HSS may be the centralized network storage if the 5G UE is served by different 3GPP AAA servers.

The 3GPP AAA server may perform authorization challenge by sending an EAP-Request/AKA'-Challenge together with the new created pseudonym towards the 5G UE. The non-3GPP access network may send EAP-Request/AKA'-Challenge which may contain the new created pseudonym, towards the 5G UE. The 5G UE may replace the initial pseudonym with the new pseudonym for the future access authentication for non-3GPP access in EPS, e.g., as defined in subclause 6 in 3GPP TS 33.402 or the any future access authentication.

During this non-3GPP registration, the 4G UE or 5G UE or any other generation UE may perform several periodic re-registrations due to e.g., time expiration or change of location or any other reason. The 3GPP AAA server may therefore create a new pseudonym which replace the old pseudonym within the same non-3GPP registration.

FIG. 1A depicts a wireless communication system 100 for using a pseudonym for access authentication over non-3GPP access, according to embodiments of the disclosure. In one embodiment, the wireless communication system 100 includes at least one remote unit 105, a 5G-RAN 115, and a mobile core network 140. The 5G-RAN 115 and the mobile core network 140 form a mobile communication network. The 5G-RAN 115 may be composed of a 3GPP access network 120 containing at least one cellular base unit 121 and/or a non-3GPP access network 130 containing at least one access point 131. The remote unit communicates with the 3GPP access network 120 using 3GPP communication links 123 and communicates with the non-3GPP access network 130 using non-3GPP communication links 133. Even though a specific number of remote units 105, 3GPP access networks 120, cellular base units 121, 3GPP communication links 123, non-3GPP access networks 130, access points 131, non-3GPP communication links 133, and mobile core networks 140 are depicted in FIG. 1A, one of skill in the art will recognize that any number of remote units 105, 3GPP access networks 120, cellular base units 121, 3GPP communication links 123, non-3GPP access networks 130, access points 131, non-3GPP communication links 133, and mobile core networks 140 may be included in the wireless communication system 100.

In one implementation, the wireless communication system 100 is compliant with the 5G system specified in the 3GPP specifications. More generally, however, the wireless communication system 100 may implement some other open or proprietary communication network, for example, LTE/EPC (referred as '4G') or WiMAX, among other networks. The present disclosure is not intended to be limited to the implementation of any particular wireless communication system architecture or protocol.

In one embodiment, the remote units 105 may include computing devices, such as desktop computers, laptop computers, personal digital assistants ("PDAs"), tablet computers, smart phones, smart televisions (e.g., televisions connected to the Internet), smart appliances (e.g., appliances connected to the Internet), set-top boxes, game consoles, security systems (including security cameras), vehicle on-board computers, network devices (e.g., routers, switches, modems), or the like. In some embodiments, the remote units 105 include wearable devices, such as smart watches, fitness bands, optical head-mounted displays, or the like. Moreover, the remote units 105 may be referred to as UEs, subscriber units, mobiles, mobile stations, users, terminals, mobile terminals, fixed terminals, subscriber stations, user terminals, wireless transmit/receive unit ("WTRU"), a device, or by other terminology used in the art.

The remote units 105 may communicate directly with one or more of the cellular base units 121 in the 3GPP access network 120 via uplink ("UL") and downlink ("DL") communication signals. Furthermore, the UL and DL communication signals may be carried over the 3GPP communication links 123. Similarly, the remote units 105 may communicate with one or more access points 131 in the non-3GPP access network(s) 130 via UL and DL communication signals carried over the non-3GPP communication links 133. Here, the access networks 120 and 130 are intermediate networks that provide the remote units 105 with access to the mobile core network 140.

In some embodiments, the remote units 105 communicate with a remote host (e.g., in the data network 150) via a network connection with the mobile core network 140. For example, an application 107 (e.g., web browser, media client, telephone/VoIP application) in a remote unit 105 may trigger the remote unit 105 to establish a PDU session (or other data connection) with the mobile core network 140 using the 5G-RAN 115 (e.g., a 3GPP access network 120 and/or a non-3GPP access network 130). The mobile core network 140 then relays traffic between the remote unit 105 and the remote host using the PDU session. Note that the remote unit 105 may establish one or more PDU sessions (or other data connections) with the mobile core network 140. A PDU Session may be defined by its parameters: [DNN, Type, SSC mode].

The cellular base units 121 may be distributed over a geographic region. In certain embodiments, a cellular base unit 121 may also be referred to as an access terminal, a base, a base station, a Node-B, an eNB, a gNB, a Home Node-B, a relay node, a device, or by any other terminology used in the art. The cellular base units 121 are generally part of a radio access network ("RAN"), such as the 3GPP access network 120, that may include one or more controllers communicably coupled to one or more corresponding cellular base units 121. These and other elements of radio access network are not illustrated but are well known generally by those having ordinary skill in the art. The cellular base units 121 connect to the mobile core network 140 via the 3GPP access network 120.

The cellular base units 121 may serve a number of remote units 105 within a serving area, for example, a cell or a cell sector, via a 3GPP wireless communication link 123. The cellular base units 121 may communicate directly with one or more of the remote units 105 via communication signals. Generally, the cellular base units 121 transmit DL communication signals to serve the remote units 105 in the time, frequency, and/or spatial domain. Furthermore, the DL communication signals may be carried over the 3GPP communication links 123. The 3GPP communication links 123 may be any suitable carrier in licensed or unlicensed radio spectrum. The 3GPP communication links 123 facilitate communication between one or more of the remote units 105 and/or one or more of the cellular base units 121.

The non-3GPP access networks 130 may be distributed over a geographic region. Each non-3GPP access network 130 may serve a number of remote units 105 with a serving area. An access point 131 in a non-3GPP access network 130 may communicate directly with one or more remote units 105 by receiving UL communication signals and transmitting DL communication signals to serve the remote units 105 in the time, frequency, and/or spatial domain. Both DL and UL communication signals are carried over the non-3GPP communication links 133. The 3GPP communication links 123 and non-3GPP communication links 133 may employ different frequencies and/or different communication protocols. In various embodiments, an access point 131 may communicate using unlicensed radio spectrum. The mobile core network 140 may provide services to a remote unit 105 via the non-3GPP access networks 130, as described in greater detail herein.

In some embodiments, a non-3GPP access network 130 connects to the mobile core network 140 via an interworking entity 135. The interworking entity 135 provides an interworking between the non-3GPP access network 130 and the mobile core network 140. The interworking entity 135 supports connectivity via the "N2" and "N3" interfaces. As depicted, both the 3GPP access network 120 and the interworking entity 135 communicate with the AMF 143 using a "N2" interface. The 3GPP access network 120 and interworking entity 135 also communicate with the UPF 141 using a "N3" interface.

In certain embodiments, a non-3GPP access network 130 may be controlled by an operator of the mobile core network 140 and may have direct access to the mobile core network 140. Such a non-3GPP AN deployment is referred to as a "trusted non-3GPP access network." A non-3GPP access network 130 is considered as "trusted" when it is operated by the 3GPP operator, or a trusted partner, and supports certain security features, such as strong air-interface encryption. In contrast, a non-3GPP AN deployment that is not controlled by an operator (or trusted partner) of the mobile core network 140, does not have direct access to the mobile core network 140, or does not support the certain security features is referred to as a "non-trusted" non-3GPP access network. An interworking entity 135 deployed in a trusted non-3GPP access network 130 may be referred to herein as a Trusted Network Gateway Function ("TNGF"). An interworking entity 135 deployed in a non-trusted non-3GPP access network 130 may be referred to herein as a non-3GPP interworking function ("N3IWF"). While depicted as a part of the non-3GPP access network 130, in some embodiments the N3IWF may be a part of the mobile core network 140 or may be located in the data network 150.

In one embodiment, the mobile core network 140 is a 5G core ("5GC") or the evolved packet core ("EPC"), which may be coupled to a data network 150, like the Internet and private data networks, among other data networks. A remote unit 105 may have a subscription or other account with the mobile core network 140. Each mobile core network 140 belongs to a single public land mobile network ("PLMN"). The present disclosure is not intended to be limited to the implementation of any particular wireless communication system architecture or protocol.

The mobile core network 140 includes several network functions ("NFs"). As depicted, the mobile core network 140 includes multiple user plane functions ("UPFs"). Here, the mobile core network 140 includes at least a UPF ("UPF") 141.

The mobile core network 140 also includes multiple control plane functions including, but not limited to, an Access and Mobility Management Function ("AMF") 143, an Authentication Server Function ("AUSF") 147, and a Unified Data Management/Unified Data Repository function ("UDM/UDR") 149. The mobile core network 140 also includes a Home Subscriber Server ("HSS") 151 and a 3GPP AAA server ("AAA-S") 153 that provide authentication, authorization, policy control and routing information to access gateways or interworking functions for non-3GPP access. Note that the AAA-S 153 may be consolidated and/or co-located with other network functions in the mobile core network 140. In certain embodiments, the mobile core network 140 may also include a Session Management Function ("SMF"), a Policy Control Function ("PCF"), a Network Repository Function ("NRF") (used by the various NFs to discover and communicate with each other over APIs), or other NFs defined for the 5G Core. While the depicted embodiment shows the UDM consolidated with the UDR, in other embodiments the UDM and UDR may be separate entities within the mobile core network 140.

In various embodiments, the mobile core network 140 supports different types of mobile data connections and different types of network slices, wherein each mobile data connection utilizes a specific network slice. Here, a "network slice" refers to a portion of the mobile core network 140 optimized for a certain traffic type or communication service. A network instance may be identified by a S-NSSAI, while a set of network slices for which the remote unit 105 is authorized to use is identified by NSSAI. In certain embodiments, the various network slices may include separate instances of network functions, such as the SMF and UPF 141. In some embodiments, the different network slices may share some common network functions, such as the AMF 143. The different network slices are not shown in FIG. 1A for ease of illustration, but their support is assumed.

Although specific numbers and types of network functions are depicted in FIG. 1A, one of skill in the art will recognize that any number and type of network functions may be included in the mobile core network 140. Moreover, where the mobile core network 140 comprises an EPC, the depicted network functions may be replaced with appropriate EPC entities, such as an MME, S-GW, P-GW, HSS, and the like.

While FIG. 1A depicts components of a 5G RAN and a 5G core network, the described embodiments for using a pseudonym for access authentication over non-3GPP access apply to other types of communication networks and RATs, including IEEE 802.11 variants, GSM, GPRS, UMTS, LTE variants, CDMA 2000, Bluetooth, ZigBee, Sigfoxx, and the like. For example, in an 4G/LTE variant involving an EPC, the AMF 143 may be mapped to an MME, the SMF mapped to a control plane portion of a PGW and/or to an MME, the UPF 141 may be mapped to an SGW and a user plane portion of the PGW, the UDM/UDR 149 may be mapped to an HSS, etc.

As depicted, a remote unit 105 (e.g., a UE) may connect to the mobile core network (e.g., to a 5G mobile communication network) via two types of accesses: (1) via 3GPP access network 120 and (2) via a non-3GPP access network 130. The first type of access (e.g., 3GPP access network 120) uses a 3GPP-defined type of wireless communication (e.g., NG-RAN) and the second type of access (e.g., non-3GPP access network 130) uses a non-3GPP-defined type of wireless communication (e.g., WLAN). The 5G-RAN 115 refers to any type of 5G access network that can provide access to the mobile core network 140, including the 3GPP access network 120 and the non-3GPP access network 130.

In various embodiments, the remote unit 105 sends a special indicator to the mobile core network indicating its support for the access authentication for non-3GPP access network 130 in EPS. In various embodiments, the remote unit 105 sends this indicator when registering with the mobile communication network 140 via the 3GPP access network 120. Based on this special indicator, the mobile core network 140 generates and stores an initial pseudonym for the remote unit 105 and sends the same to the remote unit 105. Thereafter, when performing access authentication for a non-3GPP access network 130 in EPS, the remote unit 105 sends the initial pseudonym so as to conceal its permanent subscriber identity.

Figure 1B:
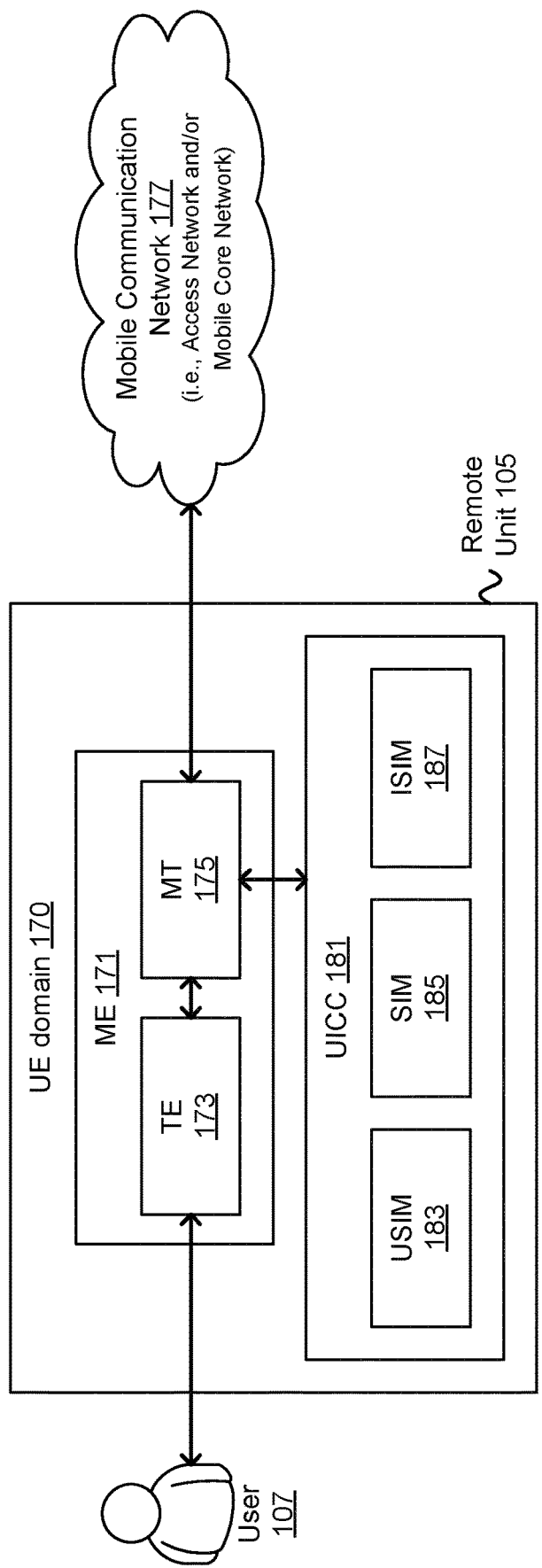

FIG. 1B depicts a block diagram of the architecture of the remote unit 105, according to embodiments of the disclosure. The remote unit 105 comprises a UE domain 170 which includes the mobile equipment ("ME") 171 and the Universal Integrated Circuit Card ("UICC") 181.

The ME 171 comprises a terminal equipment ("TE") 173 and a mobile terminal ("MT") 175. The TE may be one or more devices offering services to the user 107. For example, the TE 171 may be the part of the remote unit 105 where the user data is generated in uplink and processed in downlink. The TE 171 may run one or more end-to-end applications with which the user 107 interacts.

The MT 175 performs radio-modem transmission and related functions. For example, the MT 175 performs data and signaling message transfer with a mobile communication network 177 (e.g., the RAN 115 and mobile core network 140) through the radio interface (i.e., wireless links 123 and/or 133). Functions performed by the MT 175 include radio transmission and handover, speech encoding and decoding, error detection and correction, signaling and access to the UICC 181. In some embodiments, the TE 173 and MT 175 may be physically separable devices which are communicatively coupled (e.g., via a terminal adapter) to form the remote unit 105.

The UICC 181 comprises subscription and/or account information for the remote unit 105. The UICC 181 securely stores and ensures integrity of personal information, including subscriber identities. Subscriber data stored in the UICC 181 may include a permanent subscriber identity (i.e., IMSI and/or SUPI) and one or more authentication keys. In various embodiments, the UICC 181 comprises one or more subscriber/service identity applications, including but not limited to a Universal Subscriber Identity Module ("USIM") application 183, a Subscriber Identity Module ("SIM") application 185, and IP multimedia Service Identity Module ("ISIM") 187. Note that different types of networks may require different protocols, different authentication procedures, different types of authentication/encryption keys and/ or different types of subscriber identities, thus the UICC 181 may include different applications (e.g., USIM 183, SIM 185, etc.) to support remote unit 105 access to the different network types. In certain embodiments, the UICC 181 is a removable IC card. In other embodiments, the UICC 181 is an embedded IC. While only a single UICC 181 is depicted in FIG. 1B, in other embodiments the remote unit 105 may include multiple UICC 181.

As discussed above, in some embodiments the remote unit 105 may be assigned or preconfigured with an initial pseudonym. For example, the initial pseudonym may be configured using UICC 181, USIM 183, SIM 185 or internally in the ME 171. The initial pseudonym may at the same time be stored in one or more UDMs/UDRs 149, 3GPP AAA servers 153, AAA proxies and HSS 151 for access authentication for non-3GPP access in EPS.

FIG. 2 depicts a procedure 200 for creation and storage of an initial pseudonym, according to embodiments of the disclosure. The procedure 200 involves the UE 205 (e.g., one embodiment of the remote unit 105) that registers with a 5G core network 210 in an HPLMN using a 3GPP access (i.e., 3GPP access network 120). The 5GC 210 includes an AMF 211 (e.g., one embodiment of the AMF 143), an AUSF 213 (e.g., one embodiment of the AUSF 147), and UDM 215 (e.g., one embodiment of the UDM/UDR 149) that interacts with a HSS 217 (e.g., one embodiment of the HSS 151).

In the procedure 200, a 5G UE 205 with capability for access authentication for non-3GPP access in EPS (e.g., as defined in subclause 6 in 3GPP TS 33.402) registers to the 5GC 210 and obtains an initial pseudonym which the 5G UE 205 stores to a non-volatile memory. As used herein, "access authentication for non-3GPP access network in EPS" refers to authentication for the access (i.e., non-3GPP access network 130) and receiving an IP address. After that the UE will register to the 5GCN network with means of NAS signaling where the UE will be authenticated by the 5GCN. Although the descriptions of FIG. 2 use the terminology "5G UE," the procedure 200 is not limited to the 5G UE and may be applied to any UE or device.

The procedure 200 begins at Step 1 as the UE 205 registers to the 5GC 210 by using the 3GPP access technology (see block 221). At the time of registration, the UE 205 may indicate to the network its support for the access authentication for non-3GPP access in EPS. In certain embodiments, this is done by the UE 205 using the 5GMM capability information element, which may be inserted in the REGISTRATION REQUEST message which may be used by the UE 205 to register to the 5GS. In certain embodiments, the UE 205 only indicates to the network its support for the authentication for non-3GPP access in EPS if it is not preconfigured with a pseudonym. The UE 205 registration may be an initial registration which may be but not limited to the UE 205 may just have initiated the first-time registration to the 5GC 210. The UE 205 registration may be a mobility and periodic update registration which may be but not limited due to a timer's expiration or change of location.

Upon UE 205's registration to the 5GS and indicating to the network its support for the access authentication for non-3GPP access in EPS, the AMF 211 may locate an AUSF 213 and a UDM 215 for the UE 205 authentication. The AMF 211 may initiate to authenticate the UE 205 which may have used its SUCI for this registration.

The AMF 211 may send a Nausf_UEAuthentication_Authenticate request towards the AUSF 213 which may contain the UE 205's SUCI. Upon receipt of Nausf_UEAuthentication_Authenticate request containing the UE 205's SUCI, the AUSF 213 may send a Nudm_UEAuthentication_Get request containing the UE 205's SUCI towards the UDM 215.

In some embodiments, the UDM 215 creates the initial pseudonym locally, depicted in Option A. In other embodiments, the UDM 215 interacts with the AAA entity 219 to create the initial pseudonym, depicted in Option B.

At step 2 (Option A), the UDM 215 may create an initial pseudonym (see block 223). The UDM 215 may get the UE 205's identity such as SUPI, SUPI with SUPI type IMSI, or IMSI from the SUCI to evaluate if there is already a pseudonym allocated for that identity. The UDM 215 may create the initial pseudonym even if the UE 205 has already a pseudonym from a previous registration, performed by the UE 205.

At step 3a (Option B), the UDM 215 sends a create pseudonym request message to the AAA entity 219, the request containing the UE 205's permanent identity (see messaging 225). The AAA entity 219 creates the initial pseudonym and sends it to the UDM 215 (see messaging 227). Note that the AAA entity 219 may be the same or a different AAA entity as the 3GPP AAA server that performs access authentication with the 5G UE for non-3GPP access in EPS.

The initial pseudonym may be created but not limited, based on the UE 205's SUPI, UE 205's SUPI of type IMSI, or UE 205's IMSI or based on a random number generator which creates appropriate unique output. Alternatively, the initial pseudonym may be created by the UDM 215 or AAA entity 219 by encrypting the IMSI by its private/secret key.

The initial pseudonym may have the format of an IMSI. The created initial pseudonym may be locally stored along with the UE 205's identity in the UDM 215 (e.g., where the UDM 215 is combined or co-located with the UDR).

At step 4, the UDM 215 stores the created initial pseudonym and the UE 205's identity in a centralized network storage, which may be an HSS 217. The mapping of pseudonym to UE identity is stored for future UE 205 registrations to the 5GC 210 or the future UE 205 access authentications for non-3GPP access in EPS. Examples of the UE identity stored with the pseudonym include, but are not limited to, the matching UE 205's SUPI, the UE 205's SUPI of type IMSI, and the UE 205's IMSI. The UDM 215 sends a storage request message (e.g., Store Pseudonym Request) which contains the created initial pseudonym and the UE 205's identity (see messaging 229).

The HSS 217 may be accessible from several UDM 215s or several 3GPP AAAs for this information. If the HSS 217 has already assigned corresponding values for these parameters, the HSS 217 may replace those values with the recent values it has obtained from the UDM 215. Note that the stored mapping may be accessible to both 3GPP access networks and non-3GPP access networks.

In certain embodiments of Option B, the AAA entity 219 may send the created initial pseudonym and UE identity directly to the HSS 217. In such embodiments, the UDM 215 does not need to send the store pseudonym request to the HSS 217. Rather, the AAA entity 219 sends the Store Pseudonym request to the HSS 217.

At step 5, the HSS 217 may acknowledge to the UDM 215, the storage of the created initial pseudonym and the UE 205's identity (see messaging 229). In some embodiments, the HSS 217 may deny the storage request, e.g., due to having an existing values already stored. If the HSS 217 denies storing the created initial pseudonym and the UE 205's identity, then the HSS 217 may provide the already existing corresponding values to the UDM 215. Alternatively, where the HSS 217 received the store pseudonym request from the AAA entity 219, then the HSS 217 may acknowledge to the AAA entity 219 the storage of the created initial pseudonym and the US 205's identity.

At step 6, the UDM 215 initiates a UE Parameter Update ("UPU") procedure and sends to the UE 205 the created initial pseudonym (see block 231). The UDM 215 may send a Nudm_UEAuthentication_Get response containing the initial pseudonym along with authentication parameters to the AUSF 213. The AUSF 213 may initiate to challenge the UE 205's authentication by sending a Nausf_UEAuthentication_Authenticate response towards the UE 205 via the AMF 211. Once the AUSF 213 receives the UE 205's response via the AMF 211 in a Nausf_UEAuthentication_Authenticate request, the AUSF 213 may send a Nausf_UEAuthentication_Authenticate response towards the AMF 211 containing the initial pseudonym along with success result code.

The AMF 211 may send the initial pseudonym towards the UE 205 by using payload container with the payload container type information element of value "UE 205 parameters update transparent container". In an alternative to step 6, the UDM 215 may provide the initial pseudonym in the subscription profile to the AMF 211 which may send the created initial pseudonym to the UE 205 in the registration accept message. The payload container may be sent to the UE 205 in a registration accept message which may be sent by the network to the UE 205 or by any message to update the configuration data.

At step 7, the UE 205 may store the created initial pseudonym or any other pseudonym for the access authentication for non-3GPP access in EPS received from the network, in a non-volatile memory (see block 233). If the UE 205 has already an existing pseudonym in the non-volatile memory, the UE 205 may replace the already existing pseudonym with the new one which was obtained from the network in message 6.

FIG. 3 depicts a procedure 300 for creation and storage of an initial pseudonym, according to embodiments of the disclosure. The procedure 300 involves the UE 205, the 5GC 210, the AMF 211, the AUSF 213, the UDM 215, and the HSS 217. The procedure 300 presents an alternative to the procedure 200 discussed above. While the UDM 215 generates the initial pseudonym in the procedure 200, in the procedure 300 it is the HSS 217 that generates the initial pseudonym.

In the procedure 300, a 5G UE 205 with capability for access authentication for non-3GPP access in EPS (e.g., as defined in subclause 6 in 3GPP TS 33.402) registers to the 5GC 210 and obtains an initial pseudonym which the 5G UE 205 stores to a non-volatile memory. Although the descriptions of FIG. 3 use the terminology "5G UE," the procedure 200 is not limited to the 5G UE and may be applied to any UE or device.

The procedure 300 begins at Step 1 as the UE 205 may register to the 5GCN by using the 3GPP access technology (see block 221). At the time of registration, the UE 205 may indicate to the network its support for the access authentication for non-3GPP access in EPS, as described above with reference to FIG. 2, Step 1.

Upon the UE's registration to the 5GS and indicating to the network its support for the access authentication for non-3GPP access in EPS, the AMF 211 may locate an AUSF 213 and a UDM 215 for the UE 205 authentication, as described above with reference to FIG. 2.

At step 2, the UDM 215 may send the UE 205's SUPI where the SUPI type is IMSI and/or IMSI to the HSS 217 and may request the HSS 217 to create an initial pseudonym (see messaging 301). The UDM 215 may get the UE 205's identity such as SUPI, SUPI with SUPI type IMSI or IMSI from the SUCI to evaluate if there is already a pseudonym allocated for that identity.

In some embodiments, the HSS 217 creates the initial pseudonym locally, depicted in Option A. In other embodiments, the HSS 217 interacts with the AAA entity 219 to create the initial pseudonym, depicted in Option B.

At step 3 (Option A), the HSS 217 may locally create an initial pseudonym (see block 303). The created initial pseudonym may be created even if the UE 205 has already a pseudonym from a previous registration, performed by the UE 205.

At step 4a (Option B), the HSS 217 sends a create pseudonym request message to the AAA entity 219, the request containing the UE 205's permanent identity (see messaging 305). At step 4b, the AAA entity 219 creates the initial pseudonym and sends it to the HSS 217 (see messaging 307). Note that the AAA entity 219 may be the same or a different AAA entity as the 3GPP AAA server that performs access authentication with the 5G UE for non-3GPP access in EPS.

The initial pseudonym may be created but not limited, based on the UE 205's SUPI, the UE 205's SUPI of type IMSI, or the UE 205's IMSI or based on a random number generator which creates appropriate unique output. Alternatively, the initial pseudonym is created by the HSS 217 or AAA entity 219 encrypting the IMSI by its private/secret key.

The initial pseudonym may have the format of an IMSI. The created initial pseudonym may be locally stored along with the UE 205's identity in the HSS 217. The HSS 217 which may be a centralized network storage, may store the created initial pseudonym and the UE 205's identity which may be but not limited to the matching UE 205's SUPI, UE 205's SUPI of type IMSI, or UE 205's IMSI. The HSS 217 may use these stored UE 205's identity and the initial pseudonym for future UE registrations to the 5GCN or the future UE access authentications for non-3GPP access in EPS. The HSS 217 may be accessible from several UDM 215s or several 3GPP AAAs for this information. If the HSS 217 has already assigned corresponding values for these parameters, the HSS 217 may replace those values with the newly created initial pseudonym.

At step 5, the HSS 217 may send to the UDM 215/UDR, the initial pseudonym and the UE 205's identity (see messaging 309). The UDR may store the UE 205's identity which may be but not limited to the matching UE 205's SUPI, UE 205's SUPI of type IMSI, or UE 205's IMSI and the created initial pseudonym.

At step 6, the UDM sends the initial pseudonym to the UE inside a Registration Accept message (see block 311). The UDM 215 may send a Nudm_UEAuthentication_Get response containing the initial pseudonym along with authentication parameters to the AUSF 213. The AUSF 213 may initiate to challenge the UE 205's authentication by sending a Nausf_UEAuthentication_Authenticate response towards the UE 205 via the AMF 211. Once the AUSF 213 received the UE 205's response via the AMF 211 in a Nausf_UEAuthentication_Authenticate request, the AUSF 213 may send a Nausf_UEAuthentication_Authenticate response towards the AMF 211 containing the initial pseudonym along with success result code. The AMF 211 may send the initial pseudonym towards the UE 205 by using payload container with the payload container type information element of value "UE parameters update transparent container". The payload container may be sent to the UE 205 in a registration accept message which may be sent by the network to the UE 205 or by any message to update the configuration data. Alternatively, the UDM 215 may initiate a UE Parameter Update procedure to send the initial pseudonym to the UE 205.

At step 7, the UE 205 may store the created initial pseudonym or any other pseudonym for the access authentication for non-3GPP access in EPS received from the network, in a non-volatile memory (see block 233). If the UE 205 has already an existing pseudonym in the non-volatile memory, then the UE 205 may replace the already existing pseudonym with the new one which was obtained from the network in message 6.

FIGS. 4A-4C depict a procedure 400 for using a pseudonym for access authentication over non-3GPP access, according to embodiments of the disclosure. The procedure 400 illustrates a first solution for TNGF reauthentication which involves the UE 205, a non-3GPP access 401 (i.e., one embodiment of the non-3GPP access network 130), an AAA proxy 403 located in a VPLMN, a 3GPP AAA server 405 located in an EPC in the HPLMN, and the HSS 217 located in the EPC in the HPLMN. In the most typical case, the non-3GPP access network 210 is a WLAN access network complying with the IEEE 802.11 specification.

The procedure 400 represents an example of the procedure where the 5G UE with capability for access authentication for non-3GPP access in EPS (as defined in subclause in TS 3GPP 33.402), performs the access authentication for non-3GPP access in EPS. Although the illustration uses the terminology 5G UE, the procedure is not limited to the 5G UE and may be applied to a UE or device from any generation of the 3GPP technology.

At FIG. 4A, the procedure 400 begins at step 0 as the UE 205 decides to connect to a non-3GPP access network, e.g., using the "access authentication for non-3GPP access in EPS" procedure, as defined in subclause in TS 3GPP 33.402 (see block 407).

At step 1 the UE 205 first establishes a Layer-2 (L2) connection with an access point in the non-3GPP access 401 (see messaging 409). In the case of an IEEE 802.11 WLAN, this L2 connection corresponds to an 802.11 Association.

At steps 2-3, an EAP procedure is initiated by an authenticator in the non-3GPP access 401. EAP messages are encapsulated into Layer-2 packets, e.g., into IEEE 802.11/ 802.1x packets. The authenticator in the non-3GPP access 401 sends an EAP Request/Identity message the UE 205 (see messaging 411) and the UE 205 sends a Network Access Identifier ("NAI") as a response in an EAP Response/ Identity message (see messaging 413).

In various embodiments, the UE 205 sends its identity complying with the NAI format "username@realm" (e.g., specified in 3GPP TS 23.003). Note that when the UE 205 is using a pseudonym username instead of the permanent username, the UE 205 selects the realm name portion similarly to how it selects the realm portion when using the permanent username.

In various embodiments, the NAI contains an initial pseudonym, e.g., either allocated to the UE 205 as shown in FIG. 2 or FIG. 3. In other embodiments, the NAI may contain a pseudonym that may have been allocated to the UE 205 in a previous run of the authentication procedure. Further, the NAI may indicate EAP-AKA' as the authentication method for the access authentication for non-3GPP access in EPS.

At step 4, the non-3GPP access 401 may route the message the proper 3GPP AAA server 405 based on the realm part of the NAI. Routing the message to the proper 3GPP AAA server 405 may be as described in 3GPP TS 23.003. The routing path may include one or several AAA proxies 403 (see messaging 415). The access type and the identity of the access network in which the authenticator resides, may be included by the authenticator in the Diameter message. In the case of roaming, the visited network AAA proxy 403 may include the visited network identifier in the same Diameter message. The access network identity for the access network type may be carried in the Diameter message so that UE 205 and HSS 217 use the same access network identities as input for key derivation.

At step 5, The 3GPP AAA server 405 may receive the EAP Response/Identity message that contains the subscriber identity and the access type over the SWa/SWd interface (see messaging 417). Upon receipt of the EAP Response/ Identity message, the 3GPP AAA server 405 may be able to determine if the UE 205 has already been authenticated by this 3GPP AAA server 405 in a prior EAP-AKA' authentication, if the 3GPP AAA server 405 knows the UE 205's IMSI associated with the username of this pseudonym (the format of an pseudonym-NAI is NAI=pseudonym_username@realm). In the case of roaming, the 3GPP AAA server 405 may also receive the visited network identifier in the same Diameter message that carried the EAP Response/Identity message.

At step 6, the 3GPP AAA server 405 may identify the subscriber as a candidate for authentication with EAP-AKA', based on the received identity in the EAP Response/ AKA' Identity message. The 3GPP AAA server 405 may extract the pseudonym username from the NAI. If the UE 205 indicates that it supports EAP-AKA', the 3GPP AAA server 405 may check whether it has an unused authentication vector with authentication management field separation bit=1 and the matching access network identifier available for that subscriber. If there is none, a set of new authentication vectors may be retrieved from the HSS 217.

If the 3GPP AAA server 405 can match the pseudonym username to the UE 205's IMSI to determine the UE 205's identity to forward to the HSS 217 if requesting authentication vectors. If the 3GPP AAA server 405 cannot match the pseudonym username to the UE 205's IMSI to determine the UE 205's identity, then the 3GPP AAA server 405 may forward the pseudonym username to the HSS 217 which may have stored the matching UE 205's IMSI for the pseudonym username when requesting authentication vectors (see messaging 419). The 3GPP AAA server 405 may send the identity of the visited network in case the UE 205 is in the visited network and the authentication method (which may be EAP-AKA') to the HSS 217, if requesting for a set of new authentication vectors.

At step 7a, the HSS 217 may match the pseudonym username to the IMSI, which may have been stored at the time creation on the initial pseudonym, to determine the UE 205's identity (see block 421).

Continuing on FIG. 4B, at step 7b, the HSS 217 may run an AKA algorithm in response to the request from the 3GPP AAA server 405 (see block 423). Upon receiving from the 3GPP AAA server 405 an indication that the authentication vector is for EAP-AKA', the HSS 217 may generate an authentication vector with authentication management field separation bit=1. The HSS 217 may transform this authentication vector into a new authentication vector by computing CK' and IK' with access network identity may be one of the input parameters.

At step 7c, the HSS 217 may send the transformed authentication vector to the 3GPP AAA server 405 (see messaging 423). Here, the HSS 217 may send the UE 205's identity such as IMSI to the 3GPP AAA.

At step 8, the 3GPP AAA server 405 may create a new pseudonym username to match the UE 205's IMSI (see block 427). The 3GPP AAA server 405 may store the new pseudonym username locally for future UE 205 registrations or future UE 205 access authentications for non-3GPP access in EPS. Additionally, new keying materials MSK and EMSK may be derived from CK' and IK' (e.g., according to IETF RFC 5448).

At step 9, the 3GPP AAA server 405 may forward the new pseudonym username to the HSS 217 which may be a centralized network storage that has stored the matching UE 205's IMSI for the pseudonym username (see messaging 429). If the HSS 217 has already assigned corresponding values for these parameters, the HSS 217 may replace those values with the new values.

At step 10, the 3GPP AAA server 405 may send RAND, AUTN, a message authentication code and the new pseudonym username towards the UE 205 in the access network in an EAP Request/AKA'-Challenge message (see messaging 431). The 3GPP AAA server 405 may include the access network identity in this message.

At step 11, upon receipt of the new pseudonym username the UE 205 may replace the initial pseudonym username or any other pseudonym username which was used for the EAP-AKA' authentication with the new pseudonym username for the future access authentication for non-3GPP access in EPS (see block 433). The UE 205 may verify that AUTN is correct and may therefore authenticate the access network by its identity.

At step 12, The UE may send EAP Response/AKA'-Challenge towards the 3GPP AAA server 405 (see messaging 435).

Continuing on FIG. 4C, at step 13 the 3GPP AAA server 405 may check the received parameters from UE in the EAP-Response/AKA'-Challenge and derive a Master Session Key (MSK). The 3GPP AAA server 405 may send the EAP Success message to the non-3GPP access 401, which in turn may forward the EAP Success to the UE 205 (see messaging 437). Note that the 3GPP AAA server 405 sends the MSK to the non-3GPP access 401, but the non-3GPP access 401 does not send the MSK to the UE 205. Rather, the UE 205 derives its own copy of the MSK.

At step 14, security establishment may be performed between the UE 205 and the non-3GPP access network 401, e.g., using a key derived from the MSK (see messaging 439). At step 15, upon security establishment, the UE 205 may request for an IP request allocation which it may be assigned by the non-3GPP access 401 (see messaging 441).

Figure 5:
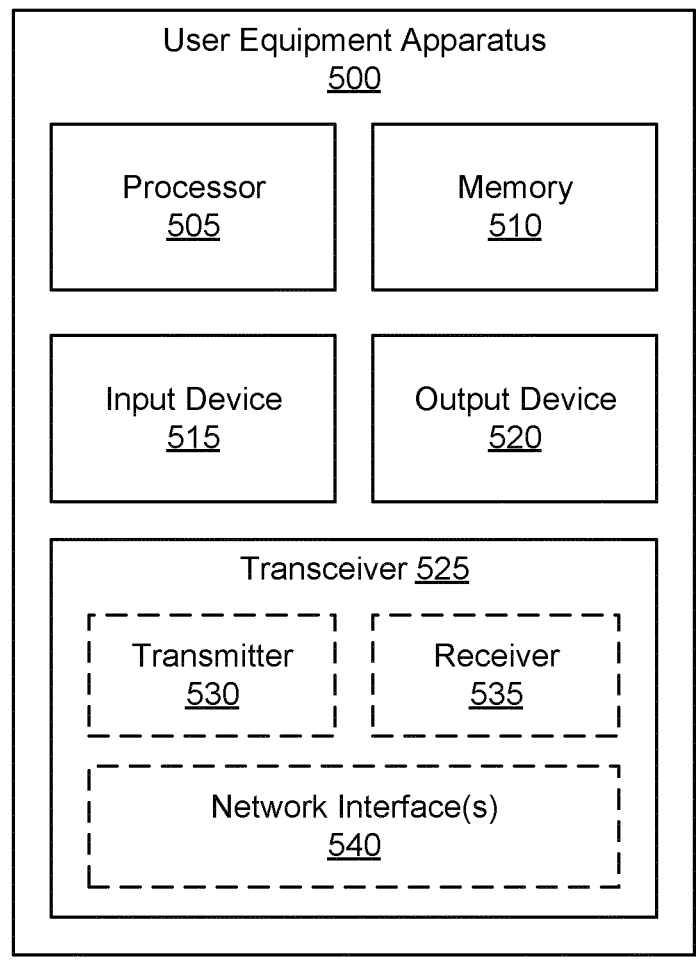
FIG. 5 is a block diagram illustrating one embodiment of a user equipment apparatus that uses a pseudonym for access authentication over non-3GPP access.

Steps x1, x2, x3 and x4 in FIG. 5 refer to the future when the UE 205 is not allocated any IP address and it may connect to a non-3GPP access 401 for the access authentication for non-3GPP access in EPS. Similar to steps 2-4, above, at steps x1 and x2 the UE 205 may receive an EAP Request/Identity message and send an EAP Response/Identity message in response (see messaging 443, 445). Here, the UE 205 may send its identity complying with NAI format, where the NAI may contain the new pseudonym. Similar to steps 4-5, above, at steps x3 and x4 the non-3GPP access 401 sends the NAI to the 3GPP AAA server 405, sent via proxy AAA server 403 when the UE 205 is roaming in the VPLMN (see messaging 447, 449).

FIG. 5 depicts one embodiment of a user equipment apparatus 500, according to embodiments of the disclosure. The user equipment apparatus 500 may be one embodiment of the remote unit 105 and/or the UE 205. Furthermore, the user equipment apparatus 500 may include a processor 505, a memory 510, an input device 515, an output device 520, a transceiver 525. In some embodiments, the input device 515 and the output device 520 are combined into a single device, such as a touch screen. In certain embodiments, the user equipment apparatus 500 does not include any input device 515 and/or output device 520. Note that the input device 515 and output device 520 may be part of an TE domain of the user equipment apparatus 500, while the transceiver 525 may be part of a MT domain of the user equipment apparatus 500.

As depicted, the transceiver 525 includes at least one transmitter 530 and at least one receiver 535. Here, the transceiver 525 communicates with a mobile core network (e.g., a 5GC) via an access network. Additionally, the transceiver 525 may support at least one network interface 540. Here, the at least one network interface 540, e.g., "Uu" interface, facilitates communication with a RAN node. Additionally, the at least one network interface 540 may include an interface used for communications with an AMF, an SMF, and/or a UPF (e.g., N1, N2, and/or N3 interfaces).

The processor 505, in one embodiment, may include any known controller capable of executing computer-readable instructions and/or capable of performing logical operations. For example, the processor 505 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 505 executes instructions stored in the memory 510 to perform the methods and routines described herein. The processor 505 is communicatively coupled to the memory 510, the input device 515, the output device 520, and the transceiver 525.

In various embodiments, the processor 505 controls the user equipment apparatus 500 to implement the above described UE behaviors. In some embodiments, via the transceiver 525 the processor 505 sends a registration message to a first network function (i.e., AMF) in the mobile communication network via the 3GPP access network, the first authentication message comprising a first indicator and a SUCI for the user equipment apparatus 500. Here, the first indicator comprises an indication that the user equipment apparatus 500 has the capability for access authentication for non-3GPP access in an EPS. The processor 505 receives (e.g., from the UDM or HSS) a first identity pseudonym (i.e., the initial pseudonym) for the user equipment apparatus 500 in response to the registration message comprising the first indicator and performs access authentication via a non-3GPP access network using the first identify pseudonym.

In some embodiments, the indication that the remote unit has the capability for access authentication for non-3GPP access in an EPS comprises a 5GMM capability information element. In some embodiments, the processor 505 determines whether an identity pseudonym is preconfigured prior to sending the registration message. In such embodiments, the processor 505 includes the first indicator in response to determining that no identity pseudonym is preconfigured.

In one embodiment, a UDM in the mobile communication network generates the first identity pseudonym. In another embodiment, an HSS in the mobile communication network generates the first identity pseudonym. In a further embodiment, an AAA server in the in the mobile communication network. In various embodiments, the mobile communication network locally stores the first identity pseudonym at the HSS.

In various embodiments, the processor 505 performing access authentication via the non-3GPP access network using the first identify pseudonym by sending a first authentication message (e.g., an EAP Response/AKA' Identity message) to a second network function (i.e., 3GPP AAA server) to authenticate with the mobile communication network via the non-3GPP access network. Here, the first authentication message comprising the first identity pseudonym (i.e., a pseudonym-NAI containing the initial pseudonym). The processor 505 receives a second authentication message (e.g., an EAP Request/AKA'-Challenge message) from the second network function (e.g., 3GPP AAA-S) in response to the first authentication message, the second authentication message comprising a challenge packet and a second identity pseudonym (e.g., the AAA-S sends an EAP-Request/AKA'-Challenge together with the new created pseudonym). Here, the mobile communication network generates the second identity pseudonym (i.e., the new pseudonym) in response to the first authentication message comprising a first identity pseudonym (e.g., the initial pseudonym or another previously received pseudonym). The processor 505 completes authentication with the mobile communication network using the challenge packet (i.e., the user equipment apparatus 500 verifies that the AUTN is correct and sends an EAP Response/AKA'-Challenge towards the 3GPP AAA-S) and locally stores the second identity pseudonym (i.e., the new pseudonym).

In some embodiments, the second network function comprises an AAA-S in the mobile communication network. In certain embodiments, the AAA-S generates the second identity pseudonym in response to the first authentication message comprising a first identity pseudonym. In some embodiments, locally storing the second identity pseudonym comprises replacing the first identity pseudonym with the second identity pseudonym. In some embodiments, the first identity pseudonym and second identity pseudonym are one-time tokens for communicating a permanent subscriber identity of the user equipment apparatus 500 in a concealed manner.

The memory 510, in one embodiment, is a computer readable storage medium. In some embodiments, the memory 510 includes volatile computer storage media. For example, the memory 510 may include a RAM, including dynamic RAM ("DRAM"), synchronous dynamic RAM ("SDRAM"), and/or static RAM ("SRAM"). In some embodiments, the memory 510 includes non-volatile computer storage media. For example, the memory 510 may include a hard disk drive, a flash memory, or any other suitable non-volatile computer storage device. In some embodiments, the memory 510 includes both volatile and non-volatile computer storage media.

In some embodiments, the memory 510 stores data relating to using a pseudonym for access authentication over non-3GPP access, for example storing subscriber identities, identity pseudonyms, security keys, IP addresses, and the like. In certain embodiments, the memory 510 also stores program code and related data, such as an operating system ("OS") or other controller algorithms operating on the user equipment apparatus 500 and one or more software applications.

The input device 515, in one embodiment, may include any known computer input device including a touch panel, a button, a keyboard, a stylus, a microphone, or the like. In some embodiments, the input device 515 may be integrated with the output device 520, for example, as a touchscreen or similar touch-sensitive display. In some embodiments, the input device 515 includes a touchscreen such that text may be input using a virtual keyboard displayed on the touchscreen and/or by handwriting on the touchscreen. In some embodiments, the input device 515 includes two or more different devices, such as a keyboard and a touch panel.

The output device 520, in one embodiment, may include any known electronically controllable display or display device. The output device 520 may be designed to output visual, audible, and/or haptic signals. In some embodiments, the output device 520 includes an electronic display capable of outputting visual data to a user. For example, the output device 520 may include, but is not limited to, an LCD display, an LED display, an OLED display, a projector, or similar display device capable of outputting images, text, or the like to a user. As another, non-limiting, example, the output device 520 may include a wearable display such as a smart watch, smart glasses, a heads-up display, or the like. Further, the output device 520 may be a component of a smart phone, a personal digital assistant, a television, a table computer, a notebook (laptop) computer, a personal computer, a vehicle dashboard, or the like.

In certain embodiments, the output device 520 includes one or more speakers for producing sound. For example, the output device 520 may produce an audible alert or notification (e.g., a beep or chime). In some embodiments, the output device 520 includes one or more haptic devices for producing vibrations, motion, or other haptic feedback. In some embodiments, all or portions of the output device 520 may be integrated with the input device 515. For example, the input device 515 and output device 520 may form a touchscreen or similar touch-sensitive display. In other embodiments, all or portions of the output device 520 may be located near the input device 515.

As discussed above, the transceiver 525 communicates with one or more network functions of a mobile communication network via one or more access networks. The transceiver 525 operates under the control of the processor 505 to transmit messages, data, and other signals and also to receive messages, data, and other signals. For example, the processor 505 may selectively activate the transceiver (or portions thereof) at particular times in order to send and receive messages.

The transceiver 525 may include one or more transmitters 530 and one or more receivers 535. Although only one transmitter 530 and one receiver 535 are illustrated, the user equipment apparatus 500 may have any suitable number of transmitters 530 and receivers 535. Further, the transmitter(s) 530 and the receiver(s) 535 may be any suitable type of transmitters and receivers. In one embodiment, the transceiver 525 includes a first transmitter/receiver pair used to communicate with a mobile communication network over licensed radio spectrum and a second transmitter/receiver pair used to communicate with a mobile communication network over unlicensed radio spectrum.

In certain embodiments, the first transmitter/receiver pair used to communicate with a mobile communication network over licensed radio spectrum and the second transmitter/receiver pair used to communicate with a mobile communication network over unlicensed radio spectrum may be combined into a single transceiver unit, for example a single chip performing functions for use with both licensed and unlicensed radio spectrum. In some embodiments, the first transmitter/receiver pair and the second transmitter/receiver pair may share one or more hardware components. For example, certain transceivers 525, transmitters 530, and receivers 535 may be implemented as physically separate components that access a shared hardware resource and/or software resource, such as for example, the network interface 540.

In various embodiments, one or more transmitters 530 and/or one or more receivers 535 may be implemented and/or integrated into a single hardware component, such as a multi-transceiver chip, a system-on-a-chip, an ASIC, or other type of hardware component. In certain embodiments, one or more transmitters 530 and/or one or more receivers 535 may be implemented and/or integrated into a multi-chip module. In some embodiments, other components such as the network interface 540 or other hardware components/circuits may be integrated with any number of transmitters 530 and/or receivers 535 into a single chip. In such embodiment, the transmitters 530 and receivers 535 may be logically configured as a transceiver 525 that uses one more common control signals or as modular transmitters 530 and receivers 535 implemented in the same hardware chip or in a multi-chip module.

Figure 6:
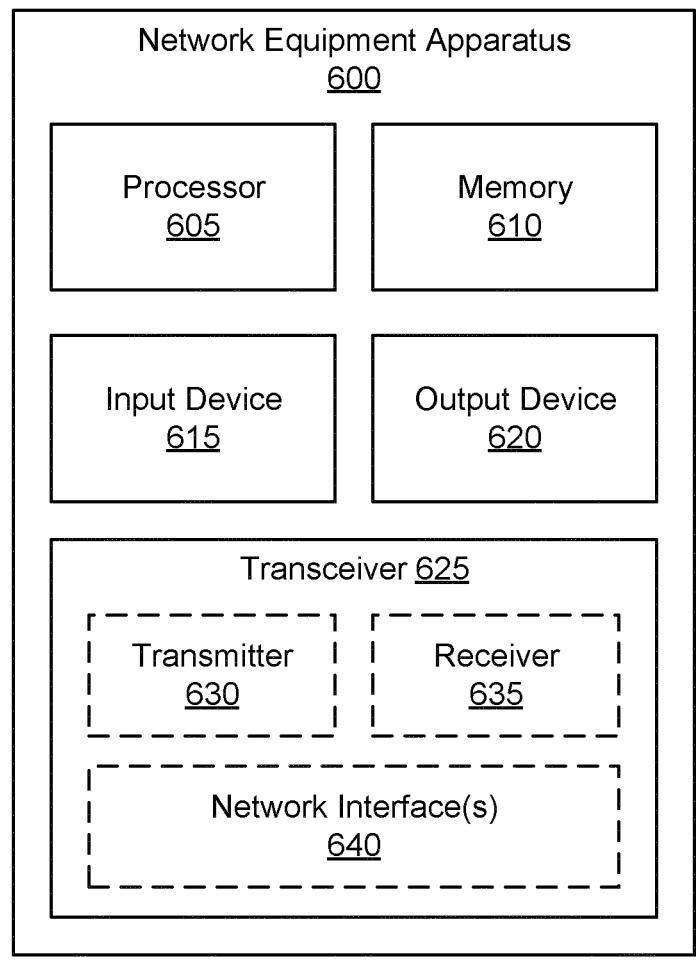
FIG. 6 is a block diagram illustrating one embodiment of a network equipment apparatus that supports access authentication over non-3GPP access using a pseudonym.

FIG. 6 depicts one embodiment of a network equipment apparatus 600, according to embodiments of the disclosure. In some embodiments, the network equipment apparatus 600 may be one embodiment of a TNGF (i.e., TNGF1 and/or TNGF2). In other embodiments, the network equipment apparatus 600 may be one embodiment of an AMF. Furthermore, network equipment apparatus 600 may include a processor 605, a memory 610, an input device 615, an output device 620, a transceiver 625. In some embodiments, the input device 615 and the output device 620 are combined into a single device, such as a touch screen. In certain embodiments, the network equipment apparatus 600 does not include any input device 615 and/or output device 620.

As depicted, the transceiver 625 includes at least one transmitter 630 and at least one receiver 635. Here, the transceiver 625 communicates with one or more remote units 105. Additionally, the transceiver 625 may support at least one network interface 640, such as the N1, N2, and N3 interfaces depicted in FIG. 1. In some embodiments, the transceiver 625 supports a first interface for communicating with a RAN node (e.g., cellular base unit 121 and/or non-3GPP access point 131), a second interface for communicating with one or more network functions in a mobile core network (e.g., a 5GC and/or EPC) and a third interface for communicating with a remote unit (e.g., UE).

The processor 605, in one embodiment, may include any known controller capable of executing computer-readable instructions and/or capable of performing logical operations. For example, the processor 605 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 605 executes instructions stored in the memory 610 to perform the methods and routines described herein. The processor 605 is communicatively coupled to the memory 610, the input device 615, the output device 620, and the transceiver 625.

In various embodiments, the processor 605 controls the network equipment apparatus 600 to implement the above described UDM behaviors. In some embodiments, via the network interface 640 the processor 605 receives a registration request from a UE (i.e., remote unit 105), where the registration request contains a first indicator and a SUCI for the UE. The processor 605 acquires an identity pseudonym for the UE in response to receiving the first indicator and stores a mapping of the identity pseudonym to a subscriber identity of the UE. The processor 605 sends the identity pseudonym to the UE, where the mobile communication network uses the identity pseudonym to authenticate the UE for non-3GPP access in an EPS.

In some embodiments, the first indicator comprises an indication that the UE has the capability for access authentication for non-3GPP access in an EPS and a subscriber identity of the UE. In certain embodiments, the indication that the UE has the capability for access authentication for non-3GPP access in an EPS comprises a 5GMM capability information element. In some embodiments, identity pseudonym comprises a one-time token for communicating a permanent subscriber identity of the UE in a concealed manner.

In some embodiments, the identity pseudonym is created using at least one of: a SUPI of the UE and an IMSI. In one embodiment, creating the identity pseudonym comprises encrypting the subscriber identifier. In one embodiment, creating the identity pseudonym comprises using a random number generator and the subscriber identity to generate a unique value. In one embodiment, creating the identity pseudonym comprises using a hash function and the subscriber identity to generate a hash value. In one embodiment, creating the identity pseudonym comprises sending the subscriber identity to an HSS in the mobile communication network and receiving the identity pseudonym from the HSS. In another embodiment, creating the identity pseudonym comprises sending the subscriber identity to a AAA server in the mobile communication network and receiving the identity pseudonym from the AAA server.

In some embodiments, the network equipment apparatus 600 comprises a UDM. In such embodiments, storing the mapping of the identity pseudonym to a permanent subscriber identity of the UE comprises sending the identity pseudonym to a home subscriber server in the mobile communication network. In one embodiment, sending the identity pseudonym to the UE comprises sending the identity pseudonym in a registration accept message. In another embodiment, sending the identity pseudonym to the UE comprises initiating a UPU procedure, where the identity pseudonym is sent to the UE within UPU data.

In various embodiments, the processor 605 controls the network equipment apparatus 600 to implement the above described AAA-S behaviors. In some embodiments, via the network interface 640 the processor 605 receives a first authentication message to authenticate a remote unit (i.e., a UE) with the mobile communication network via a non-3GPP access network, the first authentication message comprising a first identity pseudonym (e.g., an initial pseudonym) for the remote unit. Here, the first identity pseudonym was received by the remote unit during a previous registration with the mobile communication network via a 3GPP access network. The processor 605 retrieves an authentication vector for the first identity pseudonym, creates a second identity pseudonym (i.e., a new pseudonym) for the remote unit, and stores the second identity pseudonym in the mobile communication network. The processor 605 sends a second authentication message to the remote unit and completes authentication with the remote unit. Here, the second authentication message comprising the second identity pseudonym and a challenge packet derived from the authentication vector.

In some embodiments, the first identity pseudonym and second identity pseudonym are each one-time tokens for communicating a permanent subscriber identity of the remote unit in a concealed manner, where the first and second identity pseudonyms are mapped to a permanent subscriber identity of the remote unit. In some embodiments, retrieving the authentication vector comprises sending the first identity pseudonym to a HSS in the mobile communication network and receiving a permanent subscriber identity of the remote unit, where the HSS stores a mapping of the first identity pseudonym to a permanent subscriber identity of the remote unit. In certain embodiments, storing the second identity pseudonym comprises sending the second identity pseudonym to the HSS.

In some embodiments, the second identity pseudonym is created using at least one of: a subscriber permanent identifier of the remote unit and an international mobile subscriber identity. In one embodiment, creating the second identity pseudonym comprises encrypting a permanent subscriber identity of the remote unit. In one embodiment, creating the second identity pseudonym comprises using a random number generator and a permanent subscriber identity of the remote unit to generate a unique value. In one embodiment, creating the second identity pseudonym comprises using a hash function and a permanent subscriber identity of the remote unit to generate a hash value. In certain embodiments, storing the second identity pseudonym comprises replacing the first identity pseudonym with the second identity pseudonym.

In one embodiment, the processor 605 receives a request to create an identity pseudonym for a remote unit (i.e., UE) from an HSS in the mobile communication network. Here, the request may include the permanent subscriber identity of the remote unit. In response, the processor 605 creates the initial pseudonym and sends the created identity pseudonym to the HSS. In another embodiment, the processor 605 receives a request to create an identity pseudonym for a remote unit (i.e., UE) from an UDM in the mobile communication network. Here, the request may include the permanent subscriber identity of the remote unit. In response, the processor 605 creates the initial pseudonym and sends the created identity pseudonym to the UDM.

The memory 610, in one embodiment, is a computer readable storage medium. In some embodiments, the memory 610 includes volatile computer storage media. For example, the memory 610 may include a RAM, including dynamic RAM ("DRAM"), synchronous dynamic RAM ("SDRAM"), and/or static RAM ("SRAM"). In some embodiments, the memory 610 includes non-volatile computer storage media. For example, the memory 610 may include a hard disk drive, a flash memory, or any other suitable non-volatile computer storage device. In some embodiments, the memory 610 includes both volatile and non-volatile computer storage media.

In some embodiments, the memory 610 stores data relating to using a pseudonym for access authentication over non-3GPP access, for example storing subscriber identities, identity pseudonyms, security keys, IP addresses, UE contexts, and the like. In certain embodiments, the memory 610 also stores program code and related data, such as an operating system ("OS") or other controller algorithms operating on the network equipment apparatus 600 and one or more software applications.

The input device 615, in one embodiment, may include any known computer input device including a touch panel, a button, a keyboard, a stylus, a microphone, or the like. In some embodiments, the input device 615 may be integrated with the output device 620, for example, as a touchscreen or similar touch-sensitive display. In some embodiments, the input device 615 includes a touchscreen such that text may be input using a virtual keyboard displayed on the touchscreen and/or by handwriting on the touchscreen. In some embodiments, the input device 615 includes two or more different devices, such as a keyboard and a touch panel.

The output device 620, in one embodiment, may include any known electronically controllable display or display device. The output device 620 may be designed to output visual, audible, and/or haptic signals. In some embodiments, the output device 620 includes an electronic display capable of outputting visual data to a user. For example, the output device 620 may include, but is not limited to, an LCD display, an LED display, an OLED display, a projector, or similar display device capable of outputting images, text, or the like to a user. As another, non-limiting, example, the output device 620 may include a wearable display such as a smart watch, smart glasses, a heads-up display, or the like. Further, the output device 620 may be a component of a smart phone, a personal digital assistant, a television, a table computer, a notebook (laptop) computer, a personal computer, a vehicle dashboard, or the like.

In certain embodiments, the output device 620 includes one or more speakers for producing sound. For example, the output device 620 may produce an audible alert or notification (e.g., a beep or chime). In some embodiments, the output device 620 includes one or more haptic devices for producing vibrations, motion, or other haptic feedback. In some embodiments, all or portions of the output device 620 may be integrated with the input device 615. For example, the input device 615 and output device 620 may form a touchscreen or similar touch-sensitive display. In other embodiments, all or portions of the output device 620 may be located near the input device 615.

As discussed above, the transceiver 625 may communicate with one or more remote units and/or with one or more interworking functions that provide access to one or more PLMNs. The transceiver 625 may also communicate with one or more network functions (e.g., in the mobile core network 140). The transceiver 625 operates under the control of the processor 605 to transmit messages, data, and other signals and also to receive messages, data, and other signals. For example, the processor 605 may selectively activate the transceiver (or portions thereof) at particular times in order to send and receive messages.

The transceiver 625 may include one or more transmitters 630 and one or more receivers 635. In certain embodiments, the one or more transmitters 630 and/or the one or more receivers 635 may share transceiver hardware and/or circuitry. For example, the one or more transmitters 630 and/or the one or more receivers 635 may share antenna(s), antenna tuner(s), amplifier(s), filter(s), oscillator(s), mixer(s), modulator/demodulator(s), power supply, and the like. In one embodiment, the transceiver 625 implements multiple logical transceivers using different communication protocols or protocol stacks, while using common physical hardware.

Figure 7:
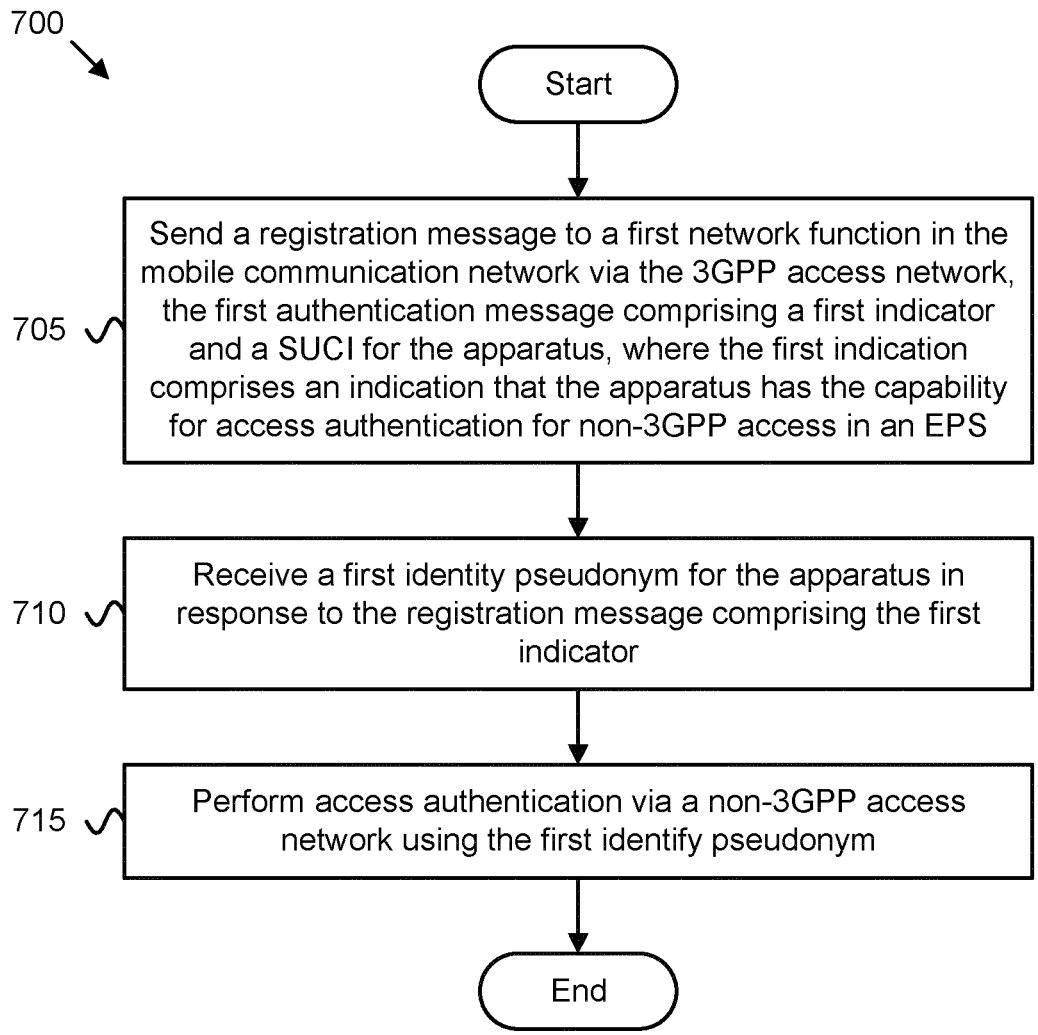
FIG. 7 is a flow chart diagram illustrating one embodiment of a first method for using a pseudonym for access authentication over non-3GPP access.

FIG. 7 depicts one embodiment of a method 700 for using a pseudonym for access authentication over non-3GPP access, according to embodiments of the disclosure. In various embodiments, the method 700 is performed by a UE, such as the remote unit 105, the UE 205, and/or the user equipment apparatus 500, described above. In some embodiments, the method 700 is performed by a processor, such as a microcontroller, a microprocessor, a CPU, a GPU, an auxiliary processing unit, a FPGA, or the like.

The method 700 begins and sends 705 sending a registration message to a first network function in a mobile communication network via a 3GPP access network, the first authentication message comprising a first indicator and a SUCI for the apparatus. Here, the first indicator comprises an indication that the apparatus has the capability for access authentication for non-3GPP access in an EPS. The method 700 includes receiving 710 a first identity pseudonym for the apparatus in response to the registration message comprising the first indicator. The method 700 includes performing 715 access authentication via a non-3GPP access network using the first identify pseudonym. The method 700 ends.

Figure 8:
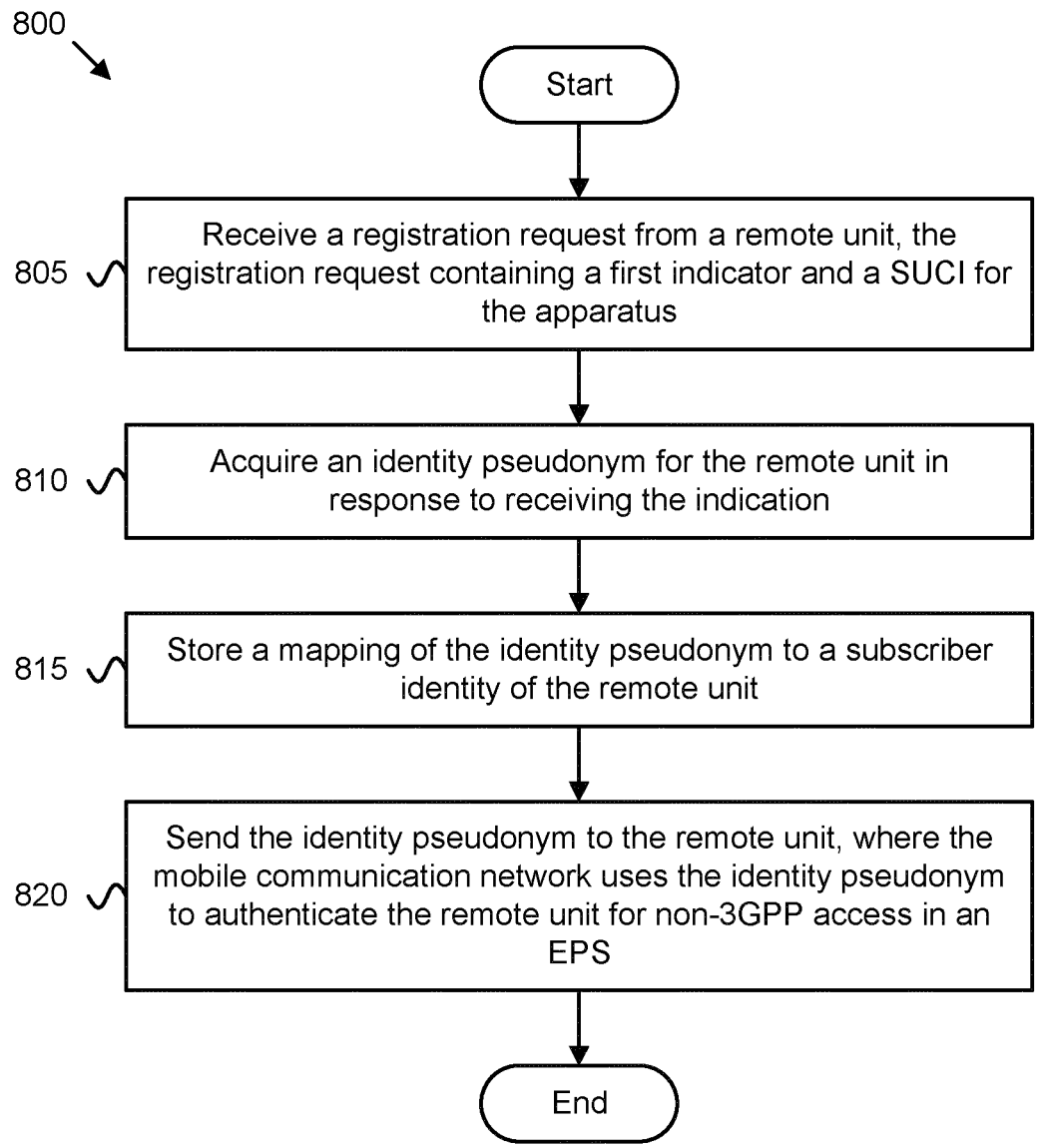
FIG. 8 is a flow chart diagram illustrating one embodiment of a second method for using a pseudonym for access authentication over non-3GPP access.

FIG. 8 depicts one embodiment of a method 800 for using a pseudonym for access authentication over non-3GPP access, according to embodiments of the disclosure. In various embodiments, the method 800 is performed by a subscription and user data manager, such as the UDM/UDR 149, the UDM 215, and/or the network equipment apparatus 600, described above. In some embodiments, the method 800 is performed by a processor, such as a microcontroller, a microprocessor, a CPU, a GPU, an auxiliary processing unit, a FPGA, or the like.

The method 800 begins and receives 805 a registration request from a remote unit, wherein the registration request contains a first indicator and a SUCI for the apparatus. The method 800 includes acquiring 810 an identity pseudonym for the remote unit in response to receiving the first indicator.

The method 800 includes storing 815 a mapping of the identity pseudonym to a subscriber identity of the remote unit. The method 800 includes sending 820 the identity pseudonym to the remote unit, where the mobile communication network uses the identity pseudonym to authenticate the remote unit for non-3GPP access in an EPS. The method 800 ends.

Figure 9:
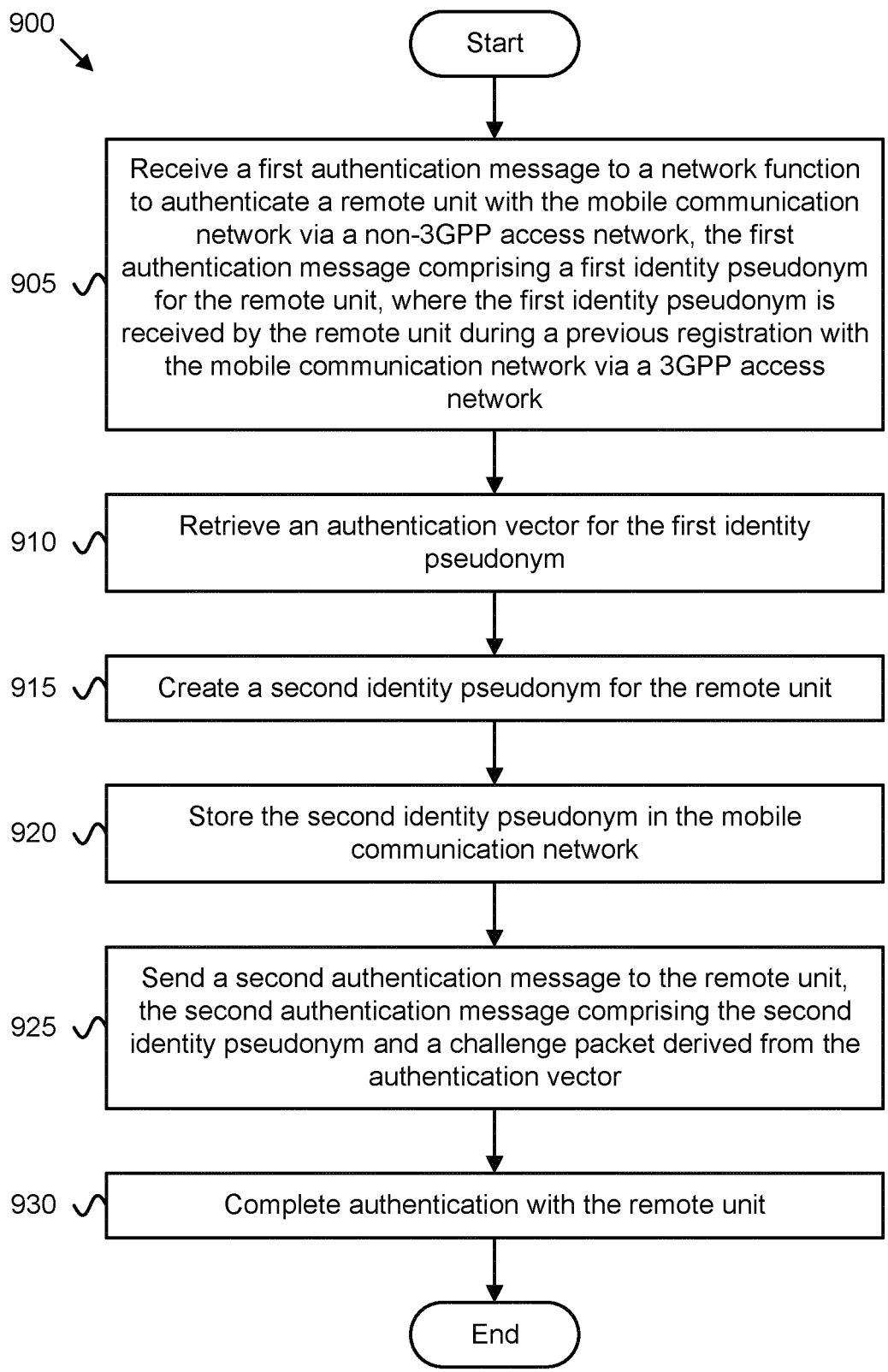
FIG. 9 is a flow chart diagram illustrating one embodiment of a third method for using a pseudonym for access authentication over non-3GPP access.

FIG. 9 depicts one embodiment of a method 900 for using a pseudonym for access authentication over non-3GPP access, according to embodiments of the disclosure. In various embodiments, the method 900 is performed by an authentication server, such as the AUSF 146, the 3GPP AAA server 405, and/or the network equipment apparatus 600, described above. In some embodiments, the method 900 is performed by a processor, such as a microcontroller, a microprocessor, a CPU, a GPU, an auxiliary processing unit, a FPGA, or the like.

The method 900 begins and receives 905 a first authentication message to authenticate a remote unit with the mobile communication network via a non-3GPP access network, the first authentication message comprising a first identity pseudonym for the remote unit. Here, the first identity pseudonym is received by the remote unit during a previous registration with the mobile communication network via a 3GPP access network.

The method 900 includes retrieving 910 an authentication vector for the first identity pseudonym. The method 900 includes creating 915 a second identity pseudonym for the remote unit. The method 900 includes storing 920 the second identity pseudonym in the mobile communication network.

The method 900 includes sending 925 a second authentication message to the remote unit, the second authentication message comprising the second identity pseudonym and a challenge packet derived from the authentication vector. The method 900 includes completing 930 authentication with the remote unit. The method 900 ends.

Figure 10:
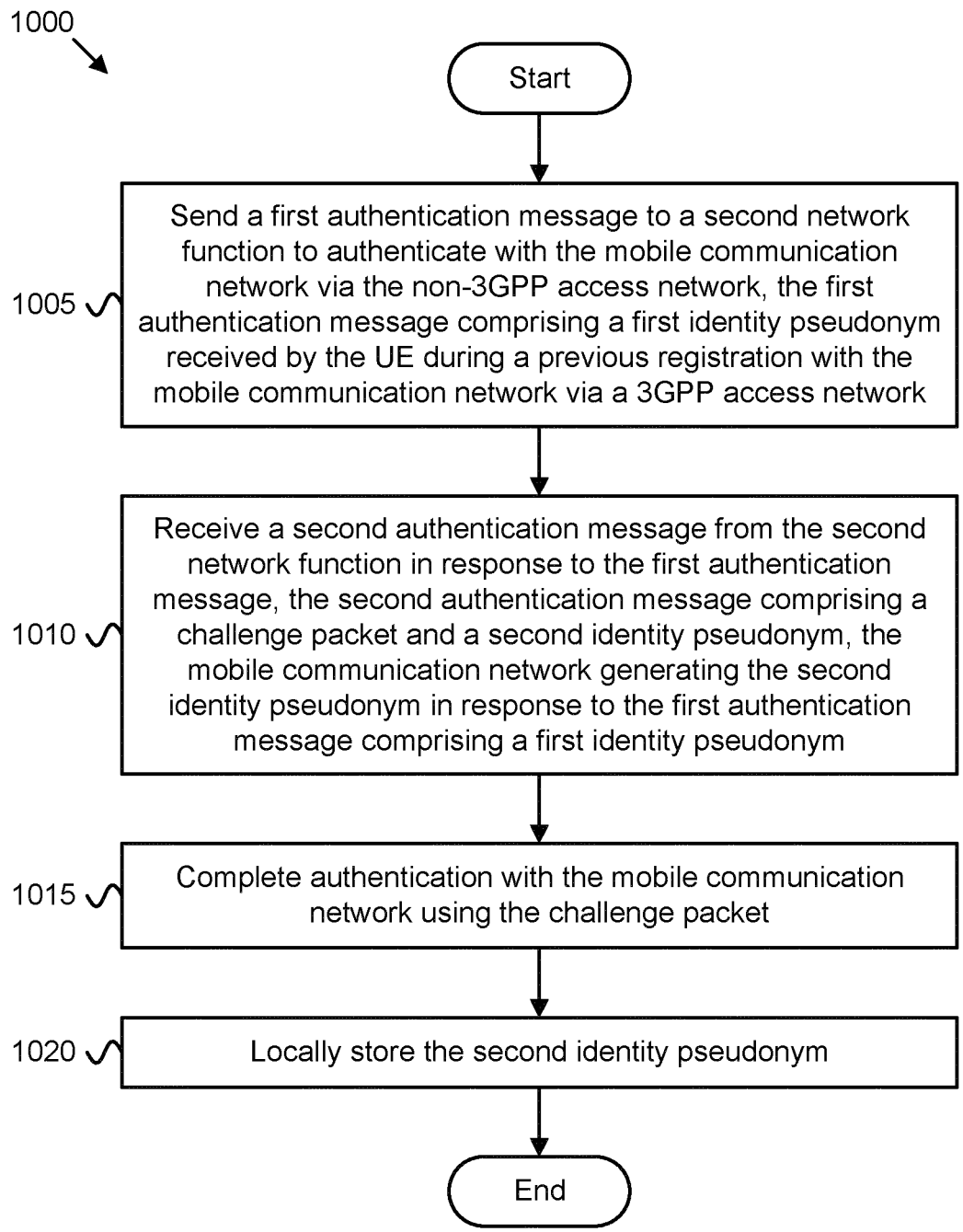
FIG. 10 is a flow chart diagram illustrating one embodiment of a fourth method for using a pseudonym for access authentication over non-3GPP access.

FIG. 10 depicts one embodiment of a method 1000 for using a pseudonym for access authentication over non-3GPP access, according to embodiments of the disclosure. In various embodiments, the method 1000 is performed by a UE, such as the remote unit 105, the UE 205, and/or the user equipment apparatus 500, described above. In some embodiments, the method 1000 is performed by a processor, such as a microcontroller, a microprocessor, a CPU, a GPU, an auxiliary processing unit, a FPGA, or the like.

The method 1000 begins and sends 1005 a first authentication message to a second network function to authenticate with the mobile communication network via the non-3GPP access network, the first authentication message comprising a first identity pseudonym received by the apparatus during a previous registration with the mobile communication network via the 3GPP access network.

The method 1000 includes receiving 1010 a second authentication message from the second network function in response to the first authentication message, the second authentication message comprising a challenge packet and a second identity pseudonym, the mobile communication network generating the second identity pseudonym in response to the first authentication message comprising a first identity pseudonym.

The method 1000 includes completing 1015 authentication with the mobile communication network using the challenge packet. The method 1000 includes locally storing 1020 the second identity pseudonym. The method 1000 ends.

Disclosed herein is a first apparatus for using a pseudonym for access authentication over non-3GPP access, according to embodiments of the disclosure. The first apparatus may be implemented by a UE, such as the remote unit 105, the UE 205, and/or the user equipment apparatus 500. The first apparatus includes a processor and a transceiver that communicates with a mobile communication network using a 3GPP access network and a non-3GPP access network. The processor sends a registration message to a first network function in the mobile communication network via the 3GPP access network, the first authentication message comprising a first indicator and a SUCI for the first apparatus, wherein the first indicator comprises an indication that the first apparatus has the capability for access authentication for non-3GPP access in an EPS. The processor receives a first identity pseudonym for the first apparatus in response to the registration message comprising the first indicator and performs access authentication via a non-3GPP access network using the first identify pseudonym.

In some embodiments, the indication that the remote unit has the capability for access authentication for non-3GPP access in an EPS comprises a 5GMM capability information element. In some embodiments, the processor determines whether an identity pseudonym is preconfigured prior to sending the registration message. In such embodiments, the processor includes the first indicator in response to determining that no identity pseudonym is preconfigured.

In some embodiments, the first identity pseudonym is a one-time token for communicating a permanent subscriber identity of the first apparatus in a concealed manner.

In one embodiment, a UDM in the mobile communication network generates the first identity pseudonym. In another embodiment, an HSS in the mobile communication network generates the first identity pseudonym. In a further embodiment, an AAA server in the in the mobile communication network. In various embodiments, the mobile communication network locally stores the first identity pseudonym at least at the UDM and the HSS.

In some embodiments, performing access authentication via the non-3GPP access network using the first identify pseudonym comprises the processor sending a first authentication message to a second network function to authenticate with the mobile communication network via the non-3GPP access network, the first authentication message comprising the first identity pseudonym. The processor receives a second authentication message from the second network function in response to the first authentication message, the second authentication message comprising a challenge packet and a second identity pseudonym. Here, the mobile communication network generates the second identity pseudonym in response to the first authentication message comprising a first identity pseudonym. The processor completes authentication with the mobile communication network using the challenge packet and locally stores the second identity pseudonym.

In some embodiments, the second network function comprises an AAA server in the mobile communication network. In certain embodiments, the AAA server generates the second identity pseudonym in response to the first authentication message comprising a first identity pseudonym. In some embodiments, locally storing the second identity pseudonym comprises replacing the first identity pseudonym with the second identity pseudonym.

Disclosed herein is a first method for using a pseudonym for access authentication over non-3GPP access, according to embodiments of the disclosure. The first method may be performed by a UE, such as the remote unit 105, the UE 205, and/or the user equipment apparatus 500. The first method includes sending a registration message to a first network function in the mobile communication network via the 3GPP access network, the first authentication message comprising a first indicator and a SUCI for the UE, wherein the first indicator comprises an indication that the UE has the capability for access authentication for non-3GPP access in an EPS. The first method includes receiving a first identity pseudonym for the UE in response to the registration message comprising the first indicator and performs access authentication via a non-3GPP access network using the first identify pseudonym.

In some embodiments, the indication that the remote unit has the capability for access authentication for non-3GPP access in an EPS comprises a 5GMM capability information element. In some embodiments, the first method includes determining whether an identity pseudonym is preconfigured prior to sending the registration message. In such embodiments, the first indicator is included in the registration message in response to determining that no identity pseudonym is preconfigured. In some embodiments, the first identity pseudonym is a one-time token for communicating a permanent subscriber identity of the UE in a concealed manner.

In one embodiment, a UDM in the mobile communication network generates the first identity pseudonym. In another embodiment, an HSS in the mobile communication network generates the first identity pseudonym. In a further embodiment, an AAA server in the in the mobile communication network. In various embodiments, the mobile communication network locally stores the first identity pseudonym at least at the UDM and the HSS.

In some embodiments, performing access authentication via the non-3GPP access network using the first identify pseudonym comprises sending a first authentication message to a second network function to authenticate with the mobile communication network via the non-3GPP access network, the first authentication message comprising the first identity pseudonym. The access authentication includes receiving a second authentication message from the second network function in response to the first authentication message, the second authentication message comprising a challenge packet and a second identity pseudonym. Here, the mobile communication network generates the second identity pseudonym in response to the first authentication message comprising a first identity pseudonym. The access authentication includes completing authentication with the mobile communication network using the challenge packet and locally storing the second identity pseudonym.

In some embodiments, the second network function comprises an AAA server in the mobile communication network. In certain embodiments, the AAA server generates the second identity pseudonym in response to the first authentication message comprising a first identity pseudonym. In some embodiments, locally storing the second identity pseudonym comprises replacing the first identity pseudonym with the second identity pseudonym.

Disclosed herein is a second apparatus for using a pseudonym for access authentication over non-3GPP access, according to embodiments of the disclosure. The second apparatus may be implemented by a subscription and user data manager, such as the UDM/UDR 149, the UDM 215, and/or the network equipment apparatus 600. The second apparatus includes a processor and a network interface that communicates with a mobile communication network. The processor receives a registration request from a remote unit (i.e., UE), where the registration request contains a first indicator and a SUCI for the remote unit. The processor acquires an identity pseudonym for the remote unit in response to receiving the first indicator and stores a mapping of the identity pseudonym to a subscriber identity of the remote unit. The processor sends the identity pseudonym to the remote unit, where the mobile communication network uses the identity pseudonym to authenticate the remote unit for non-3GPP access in an EPS.

In some embodiments, the first indicator comprises an indication that the remote unit has the capability for access authentication for non-3GPP access in an EPS and a subscriber identity of the remote unit. In certain embodiments, the indication that the remote unit has the capability for access authentication for non-3GPP access in an EPS comprises a 5GMM capability information element. In some embodiments, identity pseudonym comprises a one-time token for communicating a permanent subscriber identity of the remote unit in a concealed manner.

In some embodiments, the identity pseudonym is created using at least one of: a SUPI of the remote unit and an IMSI. In one embodiment, creating the identity pseudonym comprises encrypting the subscriber identifier. In one embodiment, creating the identity pseudonym comprises using a random number generator and the subscriber identity to generate a unique value. In one embodiment, creating the identity pseudonym comprises using a hash function and the subscriber identity to generate a hash value. In one embodiment, creating the identity pseudonym comprises sending the subscriber identity to an HSS in the mobile communication network and receiving the identity pseudonym from the HSS. In another embodiment, creating the identity pseudonym comprises sending the subscriber identity to a AAA server in the mobile communication network and receiving the identity pseudonym from the AAA server.

In some embodiments, the second apparatus comprises a UDM. In such embodiments, storing the mapping of the identity pseudonym to a permanent subscriber identity of the remote unit comprises sending the identity pseudonym to a home subscriber server in the mobile communication network. In one embodiment, sending the identity pseudonym to the remote unit comprises sending the identity pseudonym in a registration accept message. In another embodiment, sending the identity pseudonym to the remote unit comprises initiating a UPU procedure, where the identity pseudonym is sent to the remote unit within UPU data.

Disclosed herein is a second method for using a pseudonym for access authentication over non-3GPP access, according to embodiments of the disclosure. The second method may be performed by a subscription and user data manager, such as the UDM/UDR 149, the UDM 215, and/or the network equipment apparatus 600. The second method includes receiving a registration request from a remote unit, where the registration request contains a first indicator and a SUCI for the remote unit. The second method includes acquiring an identity pseudonym for the remote unit in response to receiving the first indicator and storing a mapping of the identity pseudonym to a subscriber identity of the remote unit. The second method includes sending the identity pseudonym to the remote unit, where the mobile communication network uses the identity pseudonym to authenticate the remote unit for non-3GPP access in an EPS.

In some embodiments, the first indicator comprises an indication that the remote unit has the capability for access authentication for non-3GPP access in an EPS and a subscriber identity of the remote unit. In certain embodiments, the indication that the remote unit has the capability for access authentication for non-3GPP access in an EPS comprises a 5GMM capability information element. In some embodiments, identity pseudonym comprises a one-time token for communicating a permanent subscriber identity of the remote unit in a concealed manner.

In some embodiments, the identity pseudonym is created using at least one of: a SUPI of the remote unit and an IMSI. In one embodiment, creating the identity pseudonym comprises encrypting the subscriber identifier. In one embodiment, creating the identity pseudonym comprises using a random number generator and the subscriber identity to generate a unique value. In one embodiment, creating the identity pseudonym comprises using a hash function and the subscriber identity to generate a hash value. In one embodiment, creating the identity pseudonym comprises sending the subscriber identity to an HSS in the mobile communication network and receiving the identity pseudonym from the HSS. In another embodiment, creating the identity pseudonym comprises sending the subscriber identity to a AAA server in the mobile communication network and receiving the identity pseudonym from the AAA server.

In some embodiments, the subscription and user data manager is a UDM. In such embodiments, storing the mapping of the identity pseudonym to a permanent subscriber identity of the remote unit comprises sending the identity pseudonym to a home subscriber server in the mobile communication network. In one embodiment, sending the identity pseudonym to the remote unit comprises sending the identity pseudonym in a registration accept message. In another embodiment, sending the identity pseudonym to the remote unit comprises initiating a UPU procedure, where the identity pseudonym is sent to the remote unit within UPU data.

Disclosed herein is a third apparatus for using a pseudonym for access authentication over non-3GPP access, according to embodiments of the disclosure. The third apparatus may be implemented by an authentication server, such as the AUSF 146, the 3GPP AAA server 405, and/or the network equipment apparatus 600. The third apparatus includes a processor and a network interface that communicates with a mobile communication network. The processor receives a first authentication message to authenticate a remote unit with the mobile communication network via a non-3GPP access network, the first authentication message comprising a first identity pseudonym for the remote unit. Here, the first identity pseudonym was received by the remote unit during a previous registration with the mobile communication network via a 3GPP access network. The processor retrieves an authentication vector for the first identity pseudonym, creates a second identity pseudonym for the remote unit, and stores the second identity pseudonym in the mobile communication network. The processor sends a second authentication message to the remote unit and completes authentication with the remote unit. Here, the second authentication message comprising the second identity pseudonym and a challenge packet derived from the authentication vector.

In some embodiments, the first identity pseudonym and second identity pseudonym are each one-time tokens for communicating a permanent subscriber identity of the remote unit in a concealed manner, where the first and second identity pseudonyms are mapped to a permanent subscriber identity of the remote unit. In some embodiments, retrieving the authentication vector comprises sending the first identity pseudonym to a HSS in the mobile communication network and receiving a permanent subscriber identity of the remote unit, where the HSS stores a mapping of the first identity pseudonym to a permanent subscriber identity of the remote unit. In certain embodiments, storing the second identity pseudonym comprises sending the second identity pseudonym to the HSS.

In some embodiments, the second identity pseudonym is created using at least one of: a subscriber permanent identifier of the remote unit and an international mobile subscriber identity. In one embodiment, creating the second identity pseudonym comprises encrypting a permanent subscriber identity of the remote unit. In one embodiment, creating the second identity pseudonym comprises using a random number generator and a permanent subscriber identity of the remote unit to generate a unique value. In one embodiment, creating the second identity pseudonym comprises using a hash function and a permanent subscriber identity of the remote unit to generate a hash value. In certain embodiments, storing the second identity pseudonym comprises replacing the first identity pseudonym with the second identity pseudonym.

In one embodiment, the processor receives a request to create an identity pseudonym for a remote unit (i.e., UE) from an HSS in the mobile communication network. Here, the request may include the permanent subscriber identity of the remote unit. In response, the processor creates the initial pseudonym and sends the created identity pseudonym to the HSS. In another embodiment, the processor receives a request to create an identity pseudonym for a remote unit (i.e., UE) from an UDM in the mobile communication network. Here, the request may include the permanent subscriber identity of the remote unit. In response, the processor creates the initial pseudonym and sends the created identity pseudonym to the UDM.

Disclosed herein is a third method for using a pseudonym for access authentication over non-3GPP access, according to embodiments of the disclosure. The third method may be performed by an authentication server, such as the AUSF 146, the 3GPP AAA server 405, and/or the network equipment apparatus 600. The third method includes receiving a first authentication message to authenticate a remote unit with the mobile communication network via a non-3GPP access network, the first authentication message comprising a first identity pseudonym for the remote unit. Here, the first identity pseudonym was received by the remote unit during a previous registration with the mobile communication network via a 3GPP access network. The third method includes retrieving an authentication vector for the first identity pseudonym, creates a second identity pseudonym for the remote unit, and stores the second identity pseudonym in the mobile communication network. The third method includes sending a second authentication message to the remote unit and completes authentication with the remote unit. Here, the second authentication message comprising the second identity pseudonym and a challenge packet derived from the authentication vector.

In some embodiments, the first identity pseudonym and second identity pseudonym are each one-time tokens for communicating a permanent subscriber identity of the remote unit in a concealed manner, where the first and second identity pseudonyms are mapped to a permanent subscriber identity of the remote unit. In some embodiments, retrieving the authentication vector comprises sending the first identity pseudonym to a HSS in the mobile communication network and receiving a permanent subscriber identity of the remote unit, where the HSS stores a mapping of the first identity pseudonym to a permanent subscriber identity of the remote unit. In certain embodiments, storing the second identity pseudonym comprises sending the second identity pseudonym to the HSS.

In some embodiments, the second identity pseudonym is created using at least one of: a subscriber permanent identifier of the remote unit and an international mobile subscriber identity. In one embodiment, creating the second identity pseudonym comprises encrypting a permanent subscriber identity of the remote unit. In one embodiment, creating the second identity pseudonym comprises using a random number generator and a permanent subscriber identity of the remote unit to generate a unique value. In one embodiment, creating the second identity pseudonym comprises using a hash function and a permanent subscriber identity of the remote unit to generate a hash value. In certain embodiments, storing the second identity pseudonym comprises replacing the first identity pseudonym with the second identity pseudonym.

In one embodiment, the third method includes receiving a request to create an identity pseudonym for a remote unit (i.e., UE) from an HSS in the mobile communication network. Here, the request may include the permanent subscriber identity of the remote unit. In response, the third method includes creating the initial pseudonym and sending the created identity pseudonym to the HSS. In another embodiment, the third method includes receiving a request to create an identity pseudonym for a remote unit (i.e., UE) from an UDM in the mobile communication network. Here, the request may include the permanent subscriber identity of the remote unit. In response, the third method includes creating the initial pseudonym and sending the created identity pseudonym to the UDM.

Disclosed herein is a fourth apparatus for using a pseudonym for access authentication over non-3GPP access, according to embodiments of the disclosure. The fourth apparatus may be implemented by a UE, such as the remote unit 105, the UE 205, and/or the user equipment apparatus 500. The fourth apparatus includes a processor and a transceiver that communicates with a mobile communication network using a 3GPP access network and a non-3GPP access network. The processor sends a first authentication message to a second network function to authenticate with the mobile communication network via the non-3GPP access network. Here, the first authentication message comprises a first identity pseudonym received by the fourth apparatus during a previous registration with the mobile communication network via the 3GPP access network. The processor receives a second authentication message from the second network function in response to the first authentication message. Here, the second authentication message comprises a challenge packet and a second identity pseudonym, where the mobile communication network generates the second identity pseudonym in response to the first authentication message comprising a first identity pseudonym. The processor completes authentication with the mobile communication network using the challenge packet and locally stores the second identity pseudonym.

In certain embodiments, locally storing the second identity pseudonym comprises replacing the first identity pseudonym with the second identity pseudonym. In certain embodiments, the first identity pseudonym and second identity pseudonym are one-time tokens for communicating a permanent subscriber identity of the fourth apparatus in a concealed manner. In certain embodiments, the second network function comprises an AAA server in the mobile communication network, where the AAA server generates the second identity pseudonym in response to the first authentication message comprising a first identity pseudonym. Here, the mobile communication network locally stores the first identity pseudonym and the second identity pseudonym.

In some embodiments, the previous registration with the mobile communication network comprises the processor: sending a registration message to a first network function in the mobile communication network via the 3GPP access network and receiving a first identity pseudonym for the fourth apparatus in response to the registration message comprising the first indicator. In such embodiments, the first authentication message comprising a first indicator and a SUCI for the fourth apparatus, where the first indicator comprises an indication that the fourth apparatus has the capability for access authentication for non-3GPP access in an EPS.

In certain embodiments, the indication that the remote unit has the capability for access authentication for non-3GPP access in an EPS comprises a 5GMM capability information element. In some embodiments, the processor determines whether an identity pseudonym is preconfigured prior to sending the registration message, where the processor includes the first indicator in response to determining that no identity pseudonym is preconfigured.

In some embodiments, a UDM in the mobile communication network generates the first identity pseudonym. In other embodiments, an HSS in the mobile communication network generates the first identity pseudonym.

Disclosed herein is a fourth method for using a pseudonym for access authentication over non-3GPP access, according to embodiments of the disclosure. The fourth method may be performed by a UE, such as the remote unit 105, the UE 205, and/or the user equipment apparatus 500. The fourth method includes sending a first authentication message to a second network function to authenticate with the mobile communication network via the non-3GPP access network. Here, the first authentication message comprises a first identity pseudonym received by the UE during a previous registration with the mobile communication network via the 3GPP access network. The fourth method includes receiving a second authentication message from the second network function in response to the first authentication message. Here, the second authentication message comprises a challenge packet and a second identity pseudonym, where the mobile communication network generates the second identity pseudonym in response to the first authentication message comprising a first identity pseudonym. The fourth method includes completing authentication with the mobile communication network using the challenge packet and locally storing the second identity pseudonym.

In certain embodiments, locally storing the second identity pseudonym comprises replacing the first identity pseudonym with the second identity pseudonym. In certain embodiments, the first identity pseudonym and second identity pseudonym are one-time tokens for communicating a permanent subscriber identity of the UE in a concealed manner. In certain embodiments, the second network function comprises an AAA server in the mobile communication network, where the AAA server generates the second identity pseudonym in response to the first authentication message comprising a first identity pseudonym. Here, the mobile communication network locally stores the first identity pseudonym and the second identity pseudonym.

In some embodiments, the previous registration with the mobile communication network comprises the UE sending a registration message to a first network function in the mobile communication network via the 3GPP access network and receiving a first identity pseudonym for the UE in response to the registration message comprising the first indicator. In such embodiments, the first authentication message comprising a first indicator and a SUCI for the UE, where the first indicator comprises an indication that the UE has the capability for access authentication for non-3GPP access in an EPS.

In certain embodiments, the indication that the remote unit has the capability for access authentication for non-3GPP access in an EPS comprises a 5GMM capability information element. In some embodiments, the fourth method includes determining whether an identity pseudonym is preconfigured prior to sending the registration message, where the first indicator is included in the registration message in response to determining that no identity pseudonym is preconfigured.

In some embodiments, a UDM in the mobile communication network generates the first identity pseudonym. In other embodiments, an HSS in the mobile communication network generates the first identity pseudonym.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A user equipment ("UE") comprising:
a processor; and
a memory coupled to the processor, the processor configured to cause UE to:
determine whether an identity pseudonym is preconfigured;
send a registration message to a first network function in a mobile communication network via a Third Generation Partnership Project ("3GPP") access network, the registration message comprising a first indicator and a subscription concealed identifier ("SUCI") for the UE, wherein the first indicator comprises an indication that the UE has a capability for access authentication for non-3GPP access in an evolved packet system ("EPS"), and wherein the processor is configured to cause the UE to include the first indicator in response to determining that no identity pseudonym is preconfigured;
receive a first identity pseudonym for the UE apparatus in response to the registration message comprising the first indicator; and
perform access authentication via a non-3GPP access network using the first identity pseudonym.

2. The UE of claim 1, wherein the first identity pseudonym is a one-time token for communicating a subscriber permanent identifier ("SUPI") of the UE in a concealed manner.

3. The UE of claim 1, wherein the indication comprises a fifth generation mobility management ("5GMM") capability information element.

4. The UE of claim 1, wherein, to perform access authentication via the non-3GPP access network using the first identity pseudonym, the processor is configured to:
send a first authentication message to a second network function to authenticate with the mobile communication network via the non-3GPP access network, the first authentication message comprising the first identity pseudonym;
receive a second authentication message from the second network function in response to the first authentication message, the second authentication message comprising a challenge packet and a second identity pseudonym,
complete authentication with the mobile communication network using the challenge packet; and
locally store the second identity pseudonym.

5. The UE of claim 4, wherein the second network function comprises an authentication, authorization, and accounting ("AAA") server in the mobile communication network, and wherein, to locally store the second identity pseudonym, the processor is configured to replace the first identity pseudonym with the second identity pseudonym.

6. A unified data management ("UDM") comprising:
a processor; and
a memory coupled to the processor, the processor configured to cause the UDM to:
receive a registration request from a user equipment ("UE"), wherein the registration request contains a first indicator and a subscription concealed identifier ("SUCI") for the UE;
acquire an identity pseudonym for the UE in response to receiving the first indicator, wherein the identity pseudonym is usable to authenticate the UE for non-3GPP access in an evolved packet system ("EPS");

store a mapping of the identity pseudonym to a subscriber identity of the UE;
initiate a UE parameter update ("UPU") procedure; and
send the identity pseudonym to the UE within UPU data.

7. The UDM of claim 6, wherein the first indicator comprises an indication that the UE has a capability for access authentication for non-3GPP access in an evolved packet system ("EPS") and a subscriber identity of the UE.

8. The UDM apparatus of claim 7, wherein the indication comprises a fifth generation mobility management ("5GMM") capability information element.

9. The UDM of claim 6, wherein the identity pseudonym comprises a one-time token for communicating a subscriber permanent identifier ("SUPI") of the UE in a concealed manner.

10. The UDM of claim 6, wherein, to acquire the identity pseudonym, the processor is configured to create the identity pseudonym using:
a subscriber permanent identifier ("SUPI") of the UE,
an international mobile subscriber identity ("IMSI"),
or a combination thereof.

11. The UDM of claim 6, wherein, to acquire the identity pseudonym, the processor is configured to:
encrypt the subscriber identity,
generate a unique value using a random number generator and the subscriber identity, and
generate a hash value using a hash function and the subscriber identity,
or a combination thereof.

12. The UDM of claim 6, wherein, to acquire the identity pseudonym, the processor is configured to send the subscriber identity to one of: a Home Subscriber Server ("HSS") or an authentication server in a mobile communication network and receiving the identity pseudonym from the one of a HSS and an authentication server.

13. The UDM of claim 6, wherein, to store the mapping of the identity pseudonym to a subscriber permanent identifier ("SUPI") of the UE, the processor is configured to send the identity pseudonym to a Home Subscriber Server ("HSS") in a mobile communication network.

14. The UDM of claim 9, wherein, to send the identity pseudonym to the UE, the processor is configured to:
send the identity pseudonym in a registration accept message.

15. An authentication, authorization, and accounting ("AAA") server comprising:
a processor; and
a memory coupled to the processor, the processor configured to cause the AAA server to:
receive a first authentication message to authenticate a user equipment ("UE") with a mobile communication network via a non-3GPP access network, the first authentication message comprising a first identity pseudonym for the UE, wherein the first identity pseudonym is received by the UE during a previous registration with the mobile communication network via a Third Generation Partnership Project ("3GPP") access network;
retrieve an authentication vector for the first identity pseudonym;
create a second identity pseudonym for the UE;
store the second identity pseudonym in the mobile communication network;
forward the second identity pseudonym to a home subscriber server ("HSS");
send a second authentication message to the UE, the second authentication message comprising the second identity pseudonym and a challenge packet derived from the authentication vector; and
complete authentication with the UE.

16. The AAA server of claim 15, wherein the first identity pseudonym and second identity pseudonym are each one-time tokens for communicating a subscriber permanent identifier ("SUPI") of the UE in a concealed manner, wherein the first and second identity pseudonyms are mapped to the SUPI of the UE, wherein, to store the second identity pseudonym, the processor is configured to replace the first identity pseudonym with the second identity pseudonym.

17. The AAA server of claim 15, wherein, to retrieve the authentication vector, the processor is configured to cause the AAA server to send the first identity pseudonym to the HSS in the mobile communication network and receive a subscriber permanent identifier ("SUPI") of the UE, wherein the HSS stores a mapping of the first identity pseudonym to the SUPI of the UE, and wherein, to store the second identity pseudonym, the processor is configured to cause the AAA server to send the second identity pseudonym to the HSS.

18. The AAA server of claim 15, wherein the second identity pseudonym is created using at least one of: a subscriber permanent identifier of the UE and an international mobile subscriber identity.

19. The AAA server of claim 15, wherein, to create the second identity pseudonym, the processor is configured to:
encrypt a subscriber permanent identifier ("SUPI") of the UE,
generate a unique value using a random number generator and the SUPI of the UE,
generate a hash value using a hash function and the SUPI of the UE,
or a combination thereof.

* * * * *